(12) United States Patent
Ralls et al.

(10) Patent No.: US 11,565,324 B2
(45) Date of Patent: Jan. 31, 2023

(54) SYSTEM AND METHOD FOR IN-SITU INSPECTION OF ADDITIVE MANUFACTURING MATERIALS AND BUILDS

(71) Applicant: Huntington Ingalls Incorporated, Newport News, VA (US)

(72) Inventors: John W. Ralls, Yorktown, VA (US); Zareh Soghomonian, Springfield, VA (US); Daniel John Hebert, Carrollton, VA (US); Kyle A. Wade, Poquoson, VA (US)

(73) Assignee: Huntington Ingalls Incorporated, Newport News, VA (US)

( * ) Notice: Subject to any disclaimer, the term of this patent is extended or adjusted under 35 U.S.C. 154(b) by 219 days.

(21) Appl. No.: 17/142,426

(22) Filed: Jan. 6, 2021

(65) Prior Publication Data

US 2021/0146443 A1 May 20, 2021

Related U.S. Application Data

(62) Division of application No. 15/587,003, filed on May 4, 2017, now Pat. No. 10,926,328.

(Continued)

(51) Int. Cl.
*B22F 10/20* (2021.01)
*G06F 30/00* (2020.01)
(Continued)

(52) U.S. Cl.
CPC .............. *B22F 10/20* (2021.01); *B22F 10/00* (2021.01); *G01N 27/025* (2013.01); *G06F 30/00* (2020.01);
(Continued)

(58) Field of Classification Search
CPC ...... B22F 3/1055; G06F 30/00; G01N 27/025
See application file for complete search history.

(56) References Cited

U.S. PATENT DOCUMENTS

2014/0159266 A1 6/2014 Bamberg et al.
2015/0017054 A1 1/2015 Jakimov et al.
(Continued)

FOREIGN PATENT DOCUMENTS

EP        3045467        7/2016
WO    WO 2015/109096    7/2015

OTHER PUBLICATIONS

International Application No. PCT/US17/55495, International Search Report and Written Opinion, dated Dec. 12, 2017, pp. 1-9.

(Continued)

*Primary Examiner* — Joseph S Del Sole
*Assistant Examiner* — John Robitaille
(74) *Attorney, Agent, or Firm* — Hunton Andrews Kurth LLP

(57) ABSTRACT

An inspection system for in situ evaluation of an additive manufacturing (AM) build part is provided. The inspection system comprises a build plane induction coil sensor configured and positionable so that during construction of the build part, the sensor's magnetization and sensor coils surround at least the last-produced layer of the AM build part in the build plane. The inspection system further comprises an energization circuit and a central processing system. The central processing system comprises a communication processor configured for sending command signals to the energization circuit and receiving impedance data from the build plane induction coil sensor, and energization controller configured for determining energization commands for transmission to the energization circuit, and an induction data analyzer configured for processing build part impedance data using complex impedance plane analysis and for identifying anomalies in the AM build part.

18 Claims, 24 Drawing Sheets

Related U.S. Application Data

(60) Provisional application No. 62/496,573, filed on Oct. 20, 2016.

(51) Int. Cl.
| | | |
|---|---|---|
| *B22F 10/00* | (2021.01) | |
| *G01N 27/02* | (2006.01) | |
| G05B 19/4099 | (2006.01) | |
| G06F 30/20 | (2020.01) | |
| B22F 10/30 | (2021.01) | |
| B22F 10/10 | (2021.01) | |
| B33Y 10/00 | (2015.01) | |
| B33Y 30/00 | (2015.01) | |
| B33Y 50/02 | (2015.01) | |

(52) U.S. Cl.
CPC ............... *B22F 10/10* (2021.01); *B22F 10/30* (2021.01); *B22F 2202/07* (2013.01); *B22F 2203/03* (2013.01); *B22F 2999/00* (2013.01); *B33Y 10/00* (2014.12); *B33Y 30/00* (2014.12); *B33Y 50/02* (2014.12); *G05B 19/4099* (2013.01); *G06F 30/20* (2020.01); *Y02P 10/25* (2015.11)

(56) References Cited

U.S. PATENT DOCUMENTS

| | | |
|---|---|---|
| 2016/0250711 A1 | 9/2016 | Moagar-Poladian |
| 2016/0288266 A1 | 10/2016 | Rockstroh |
| 2016/0339519 A1 | 11/2016 | Sargent |
| 2016/0349215 A1 | 12/2016 | Todorov |
| 2018/0036964 A1 | 2/2018 | DehghanNiri et al. |

OTHER PUBLICATIONS

Nelligan et al., "Introduction To Eddy Current Testing", Retrieved from the Internet: URL: https://web.archieve.org/web/20150407044419/ https://www.olympus-ims.com/en/eddycurrenttesting/ [retrieved on Mar. 12, 2020].

European Patent Office, Communication including the Extended European Search Report, European Patent Application No. 17862722.0, dated Mar. 19, 2020, pp. 1-11.

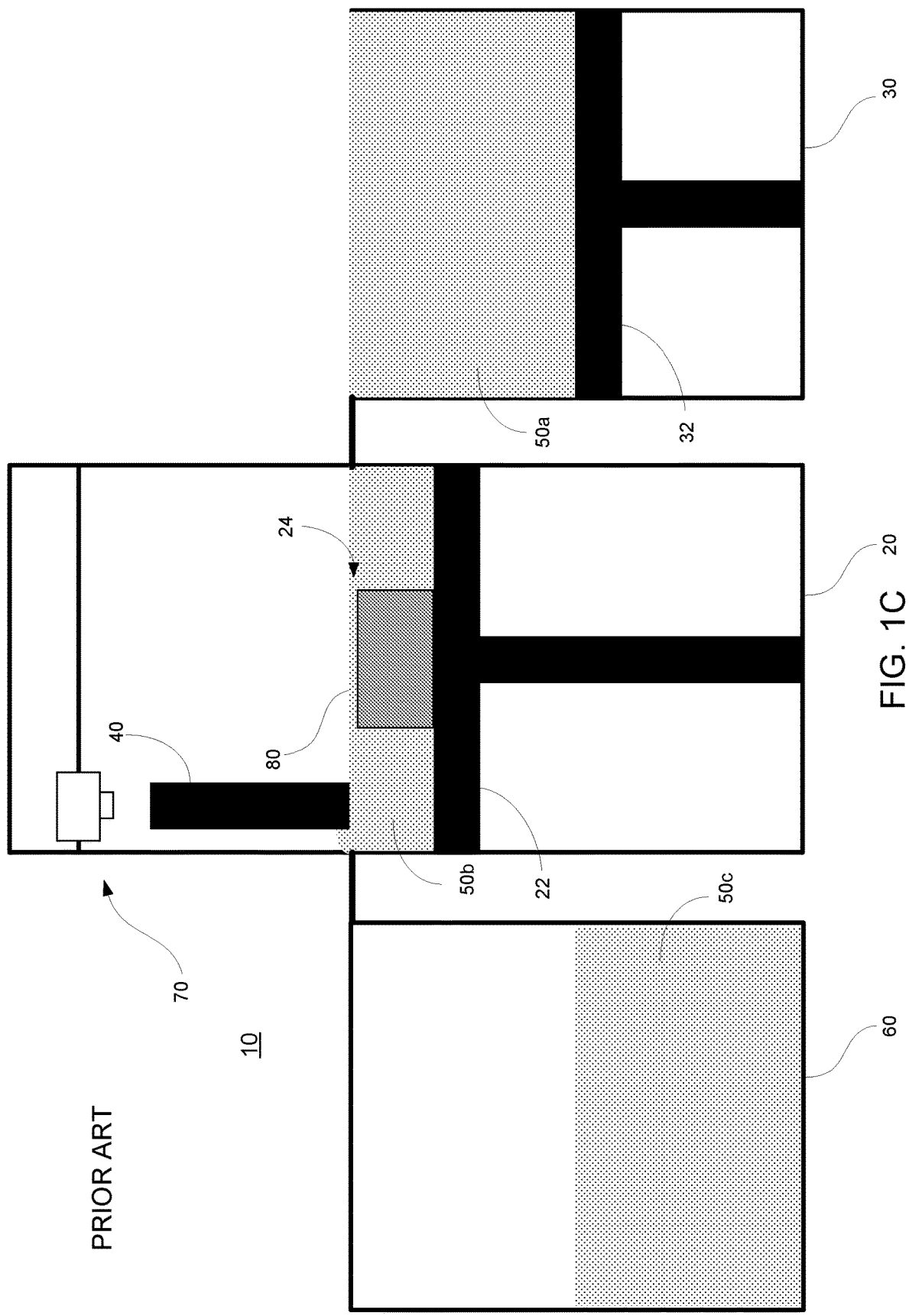

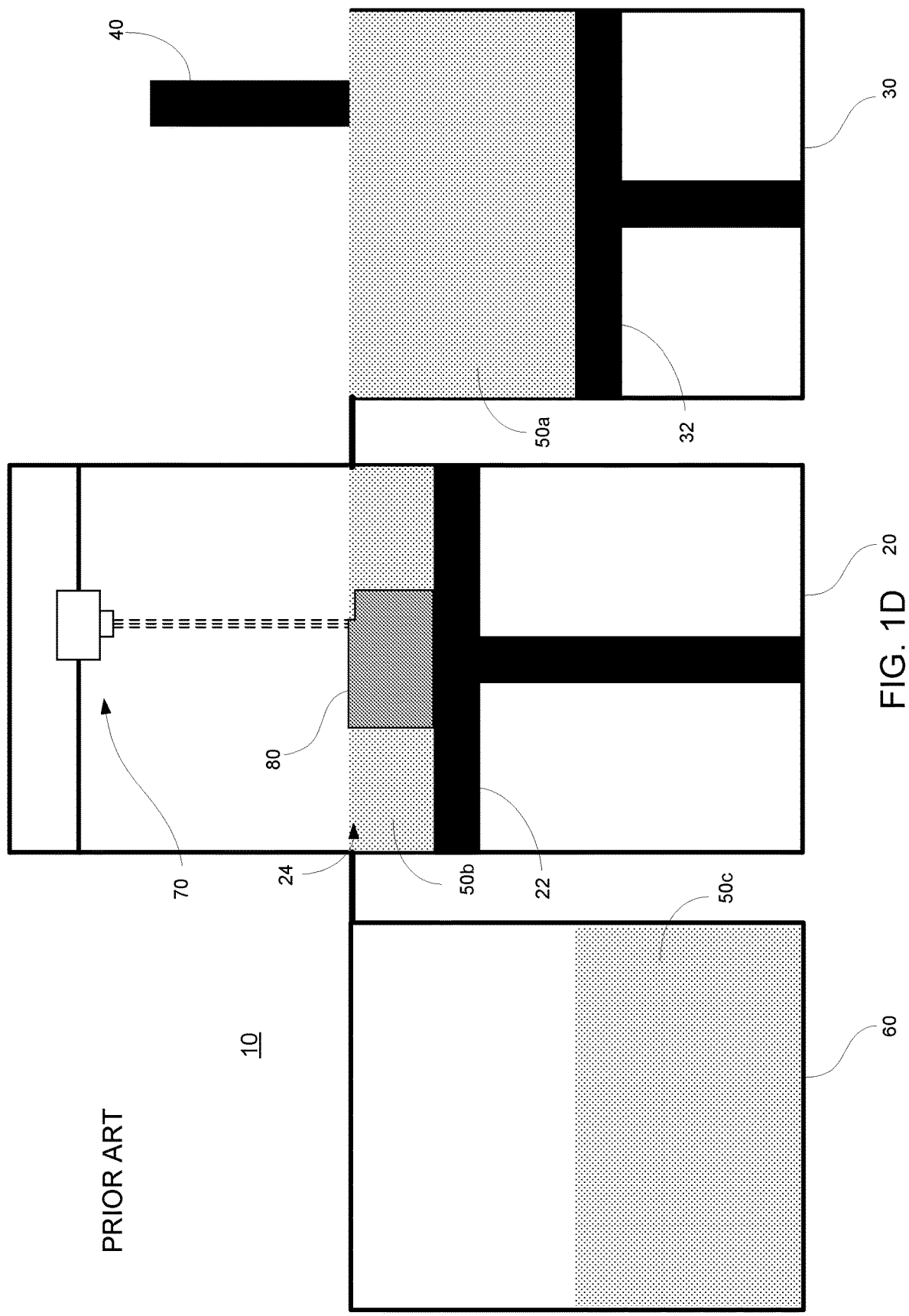

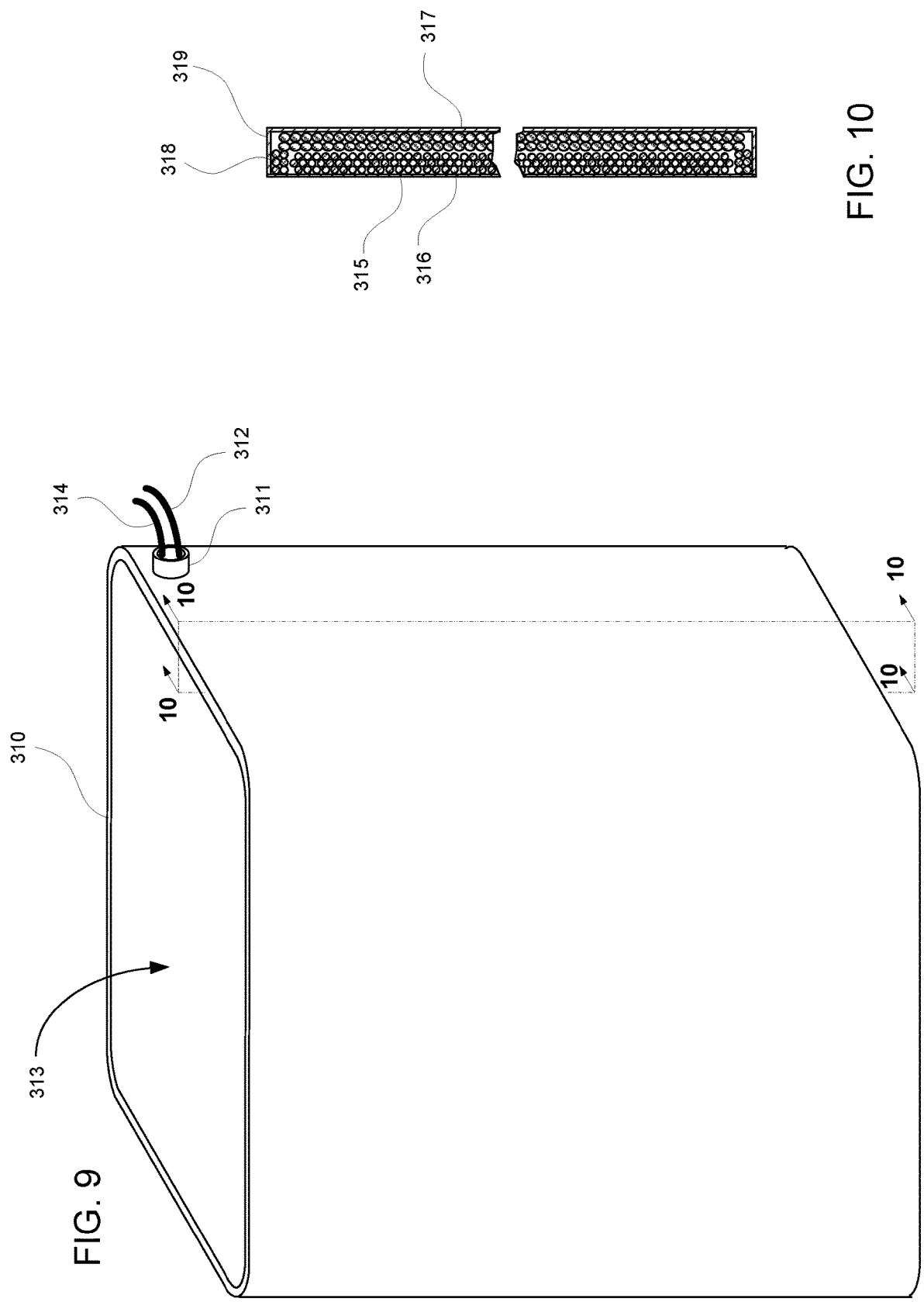

US 11,565,324 B2

SYSTEM AND METHOD FOR IN-SITU INSPECTION OF ADDITIVE MANUFACTURING MATERIALS AND BUILDS

This application is a divisional application of U.S. Utility application Ser. No. 15/587,003, filed May 4, 2017, which claims priority to U.S. Provisional No. 62/496,573, filed Oct. 20, 2016, the complete disclosures of which are incorporated herein by reference.

BACKGROUND OF THE INVENTION

This application relates generally to non-destructive evaluation (NDE) methods and, more particularly, to systems and methods for inspecting additive manufacturing materials and components formed therefrom ("builds") before, during and after the additive manufacturing process.

Additive manufacturing (AM) is the term given to processes for manufacturing three-dimensional components by progressively adding thin, substantially two-dimensional layers on a layer by layer basis. Each layer is made at a specified thickness and many layers are formed in a sequence with the two dimensional layer shape varying from layer to layer to achieve a desired three-dimensional component structure.

The additive nature of the process is in direct contrast to traditional "subtractive" manufacturing processes where material is removed to form the desired structure. AM processes have many inherent advantages over subtractive processes, including, in particular, the ability to build complex structures from digital models that may be difficult or impossible to form by traditional machining methods.

One aspect where subtractive processes have the advantage, however, is in the ability to inspect a casting or other raw part for flaws before initiating the machining process. In contrast, typical inspection of AM-manufactured parts may require virtual completion of the final structure before internal flaws can be identified and evaluated. This can result in a great deal of lost time and wasted material resulting from flaws occurring early in the AM build process.

To avoid this problem, AM machine manufacturers and users have tried various techniques for monitoring the build process in-situ (i.e., within the build chamber of the AM as the 2-D layers are added to the component being manufactured). Typical forms of in-situ monitoring that have been used include thermal imaging and visual monitoring, which are generally useful only for inspection of the most recently formed surface layer or layers. Careful inspection and control (e.g., by sieving) of the additive material is also used. None of these approaches, however, provides an accurate way to identify and classify internal flaws (i.e., flaws below the surface layer(s) or within the bulk material) during the build process.

SUMMARY OF THE INVENTION

An illustrative aspect of the invention provides a nondestructive inspection system for in situ evaluation of an AM build part. The AM build part is produced by fusing an electrically conductive build material in a sequence of layers at a horizontal build plane by an AM apparatus. The AM apparatus comprises a build chamber and a build platform configured for supporting the AM build part within the build chamber. The build platform is also configured for vertical movement to allow sequential lowering of the AM build part to position a surface of a last-produced layer of the AM build part at the build plane for addition of a next-to-be-produced layer thereto. The inspection system comprises a build plane induction coil sensor comprising coplanar magnetization and sensor coils. The build plane induction coil sensor is configured and positionable so that during construction of the build part, the magnetization and sensor coils surround at least the last-produced layer of the AM build part in the build plane. The magnetization coil is configured to induce currents within the build part and the sensor coil is configured to capture impedance data from the build part. The inspection system further comprises an energization circuit in communication with the magnetization coil of the build plane induction coil sensor and a central processing system in communication with the energization circuit and the build plane induction coil sensor. The central processing system comprises a communication processor, an energization controller, and an induction data analyzer. The communication processor is configured for sending command signals to the energization circuit and receiving impedance data from the build plane induction coil sensor. The energization controller is configured for determining energization commands for transmission to the energization circuit. The induction data analyzer is configured for processing the impedance data using complex impedance plane analysis to obtain AM build part impedance characteristics and for identifying anomalies based on differences between the AM build part impedance values and expected impedance characteristics.

Another illustrative aspect of the invention provides a method of inspecting an additive manufacturing (AM) build part during its manufacture by an AM apparatus comprising a build chamber and a build platform. The AM build part is produced by fusing an electrically conductive build material in a sequence of layers at a horizontal build plane. The AM apparatus is provided with a nondestructive inspection system comprising a central processing system and a build plane induction coil sensor configured and positioned so that at least a circumferential portion of the build plane induction coil sensor is in the build plane. The method comprises, prior to construction of a first layer of the AM build part, initializing the build plane induction coil sensor and obtaining first baseline condition data within the build chamber using the build plane induction coil sensor. The method further comprises, after fusion of one or more build layers of the AM build part at the build plane, inducing and monitoring currents in the AM build part using the build plane induction coil sensor, receiving, by the central processing system, first build part current data from the build plane induction coil sensor, and obtaining, by the central processing system, AM build part impedance values using the first baseline condition data, the first build part current data, and complex impedance plane analysis. Anomalies are then identified by comparing the AM build part impedance values with expected impedance values.

Yet another illustrative aspect of the invention provides a method of manufacturing an AM build part using an AM apparatus and a nondestructive inspection system. The AM apparatus comprises a build chamber and a build platform and is configured for fusing an electrically conductive build material in a sequence of layers at a horizontal build plane. The nondestructive inspection system comprising a central processing system and an induction coil sensor array comprising a first impedance plane induction coil sensor configured and positioned so that at least a circumferential portion of the first impedance plane induction coil sensor is in the build plane. The method comprises initializing the induction coil sensor array and obtaining baseline condition data within the build chamber using the induction coil sensor array. The method further comprises positioning an upper surface of the build platform at the build plane, depositing a layer of the build material at the build plane and fusing a portion of the build material in a desired pattern to form a current layer of the AM build part. The method still further comprises inducing and monitoring currents in the AM build part using the induction coil sensor array, receiving, by the central processing system, first build part current data from the induction coil sensor array, and obtaining, by the central processing system, AM build part impedance values using the first baseline condition data, the first build part current data, and complex impedance plane analysis. The AM build part impedance values are then compared to expected impedance values to identify anomalies. The method further comprises evaluating the nature and severity of any identified anomalies and determining whether a next build part layer should be constructed. Responsive to a determination that a next build part layer should be constructed, the build platform is lowered to position an upper surface of the current layer at the build plane, and the actions of depositing, fusing, inducing and monitoring, receiving, obtaining, comparing and determining are repeated.

BRIEF DESCRIPTION OF THE DRAWINGS

The invention can be more fully understood by reading the following detailed description together with the accompanying drawings, in which like reference indicators are used to designate like elements, and in which:

FIGS. 1A, 1B, 1C, and 1D are schematic representations of the operation of a generic AM system;

FIG. 9 is a perspective view of a magnetic induction sensor according to an embodiment of the invention;

FIG. 10 is a cross-sectional view of the magnetic induction sensor of FIG. 9;

DETAILED DESCRIPTION OF THE INVENTION

Figure 1A:
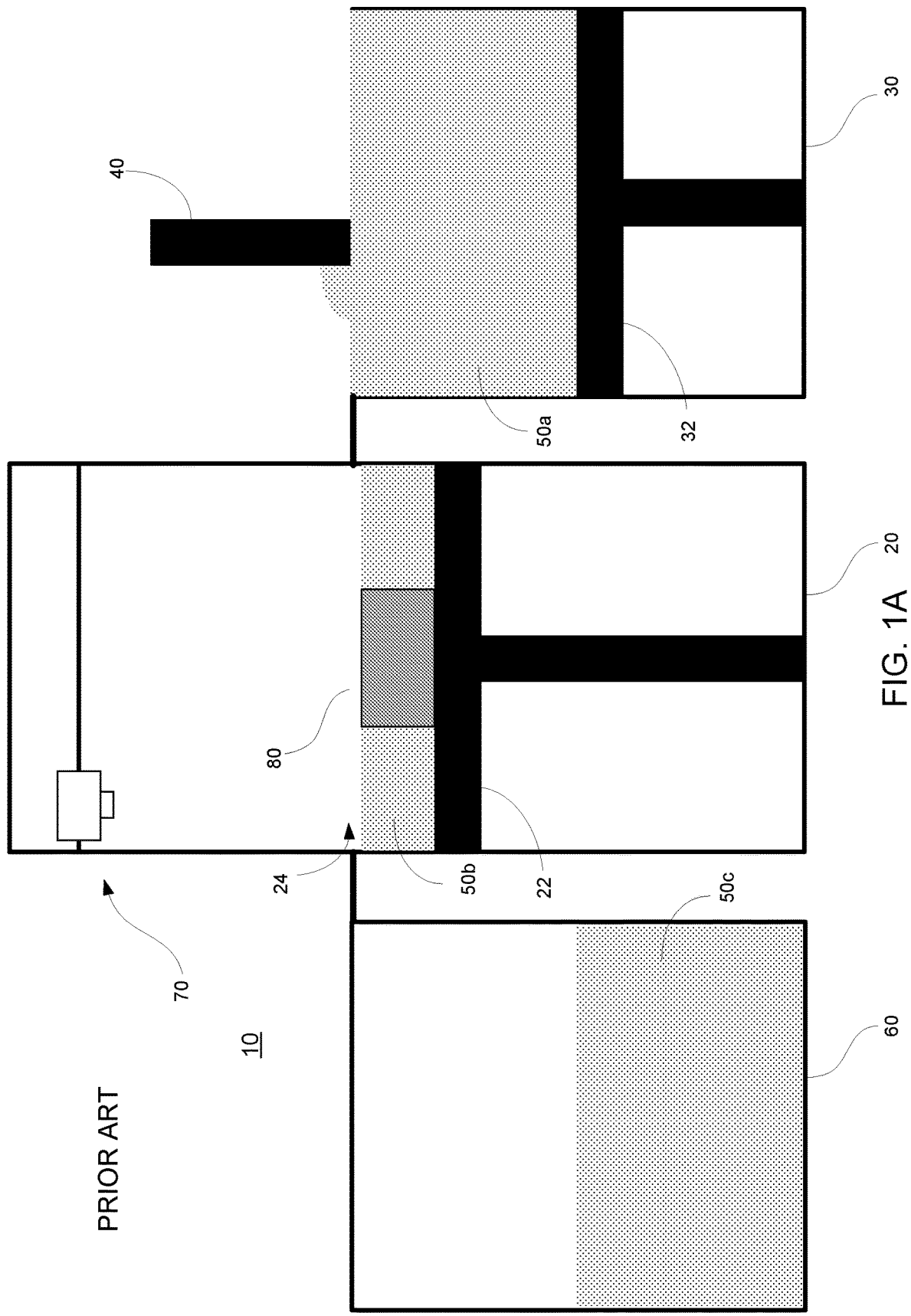

The present invention provides methods and apparatus for the inspection (in-situ or bulk) of conductive components or material and/or closed-loop-control process corrections for use in conjunction with advanced manufacturing technologies such as additive manufacturing. The methods of the invention can also be used for post-build inspection and portable inspection of raw material or built parts.

Embodiments of the present invention provide systems and methods for the use of magnetic induction and complex impedance plane analysis to inspect components (e.g., etched, printed, scribed, formed or compacted metallic powder components) produced using advanced manufacturing processes such as additive manufacturing and to inspect the materials (e.g., raw metallic powder) used in these processes.

While the invention will be described in connection with particular embodiments and manufacturing environments, it will be understood that the invention is not limited to these embodiments and environments. On the contrary, it is contemplated that various alternatives, modifications and equivalents are included within the spirit and scope of the invention as described. Such examples could include hybrid manufacturing systems (e.g., where both additive and subtractive methods are used) or subtractive engineering systems (e.g., CNC controlled devices such as lathes, mills, etc.)

While not intended to be limited to a particular application, embodiments of the invention will be described in the context of typical additive manufacturing (AM) system processes. With reference to FIGS. 1A, 1B, 1C, and 1D, a typical AM system 10 may incorporate a build chamber 20 a feed stock/raw material container 30 and a raw material collection container 60. A build platform or baseplate 22 is disposed within the build chamber 20. The build platform is generally configured to be raised or lowered relative to build chamber 20 and, in particular, relative to a build plane 24. At the start of a build process, the upper surface of the build platform 22 would typically positioned just below the build plane 24 so that a first layer of the powder material 50b may be disposed on the upper surface. After each layer of powder 50b is deposited and the build layer of the build component 80 is formed, the platform 22 is repositioned to allow deposition of the next layer of powder 50b.

It will be understood by those skilled in the art that while reference is made to a single build component or build part, AM arrangements can be used to build multiple components within simultaneously.

The AM manufacturing system 10 has a raw material delivery system configured for transporting a raw powder material 50a from the feedstock container 30 to the build chamber 20 for deposition in the build plane 24. Any suitable material delivery system may be used, but typical such systems will use a deposition device 40 such as a wiper, blade, recoater, roller or the like that pushes or otherwise moves the raw powder 50a from the feedstock container and deposits it uniformly across a predetermined area of the build plane as shown in FIG. 1B. In some systems, the material delivery system may apply powder by blowing or by direct deposition onto the build part 80. The collection chamber 60 is configured to receive and hold unfused feedstock material 50c. This may include excess feedstock from the delivery system and/or powder removed after completion of some or all of the build part 80. While the schematic illustration of system 10 shows the feedstock container 30 and the collection container 60 as being separate from the build chamber, it will be understood that in some cases, the containers 30, 60 may be internal to, attached to or integrally incorporated with the build chamber 20.

The AM manufacturing system 10 also includes an energization apparatus 70 configured to selectively apply energy to and fuse the deposited powder 50b in the build plane according to a predetermined two dimensional pattern appropriate for the particular layer being built. The energization apparatus 70 may include any form of energy delivery appropriate for the particular material being used. Delivery mechanisms may include but are not limited to lasers and electron beams. Delivery mechanisms may include but are not limited to: lasers, electron beams, ultrasonic energy, plasma, arc thermal metal spraying (ATMS), ion beam techniques plating (e.g., electrolytic), cladding case hardening dip/galvanizing, chemical vapor deposition plating (e.g., electrolytic), cold-spray, and/or other general forms of metal, composite, and/or hybrid deposition processes.

Figure 1B:
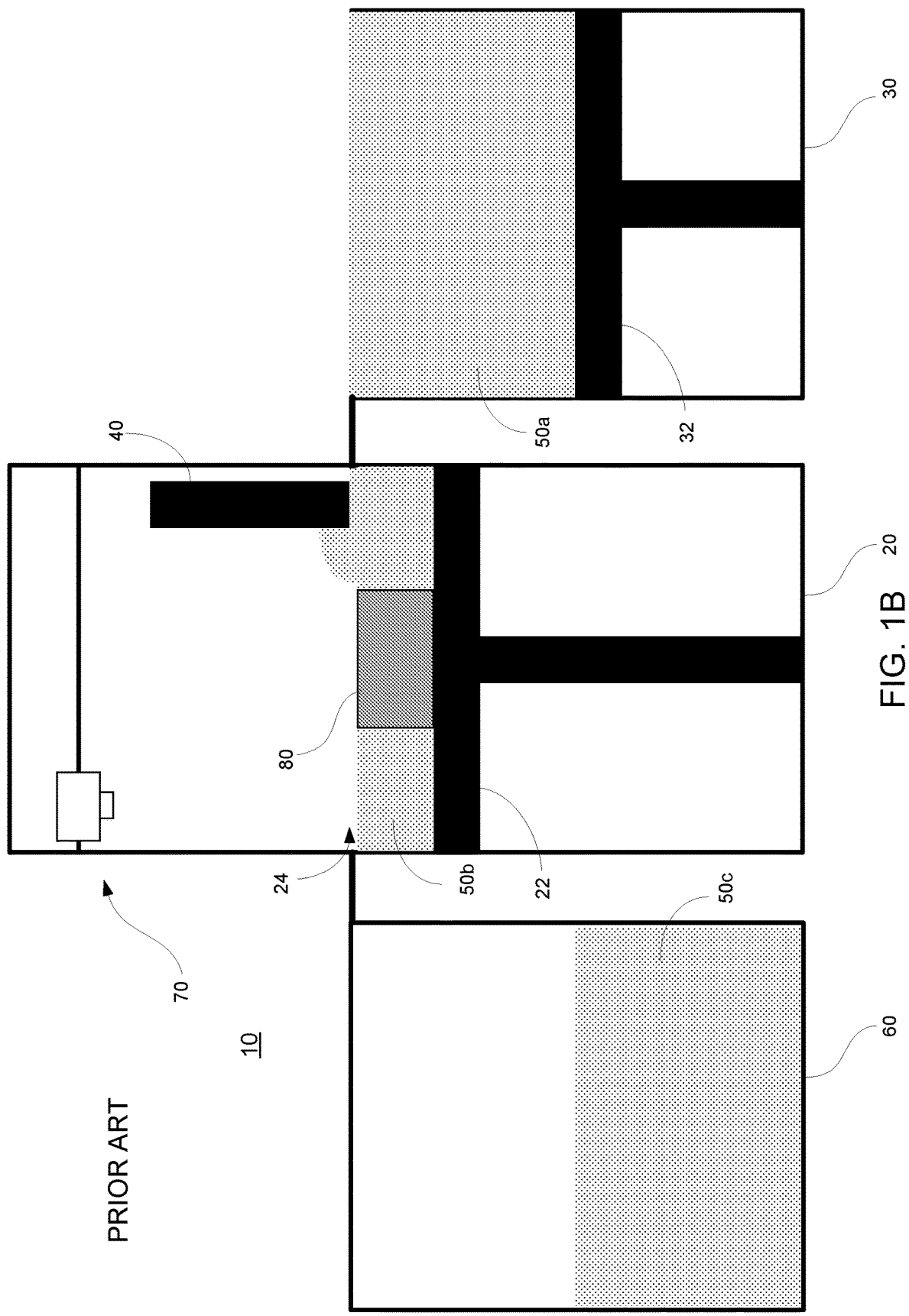

In a typical AM process, the build platform 22 is raised or lowered so as to position the upper surface of the platform 22 or the most recently deposited layer of powder 50b (and most recently formed layer of the build part 80) just below the build plane 24 as shown in FIG. 1A. The feedstock material delivery system is then used to transfer feedstock material 50a to the build chamber 20 as shown in FIGS. 1B and 1C. The energization apparatus 70 is then used to apply energy to the deposited powder 50b in the build plane 24 according to the predetermined two dimensional pattern appropriate for the current layer of the build part (or parts) 80 as shown in FIG. 1D. The process is then repeated until the build part 80 is complete. Upon completion, the unfused raw material may be removed transferred from the build chamber 20 to the collection container 60 for possible reuse and the completed build part 80 removed for inspection.

As noted above, visual, thermal or other surface inspection of the build part 80 may be conducted throughout the above process. There has, however, been no suitable method for material or part inspection that could be used to detect internal flaws and/or to adjust the build process in midstream.

The present invention contemplates the use of magnetoinductive testing methods to monitor the raw materials and/or the build part during the manufacturing process. The methods of the invention may be used to identify and evaluate anomalies using induction sensor data and complex impedance plane analysis and mathematical models. These models are direct functions of the electromagnetic and physical properties of the material and/or part being manufactured. With the use of calibrated parabolic distributions of the results found from complex impedance planes, various flaws and process anomalies can be identified. This allows not only the evaluation of part integrity and design fidelity for quality control purposes, but also for in-process adjustment and/or correction. These evaluations can be based on in situ and/or bulk inspection. The invention also encompasses methods involving the use of eddy currents and skin effects (e.g., flux damping) to identify and evaluate anomalies.

In general, the methods of the invention integrate one or more induction sensors to perform bulk or in-situ inspection of additively manufactured parts or raw material feedstock, either layer-by-layer, or as a bulk method of part inspection. The sensors and methods utilize the theory of complex impedance plane analysis along with tailored mathematical models for a given digital part file and material. The resulting analysis/data can be used to provide feed-forward/feed-back/closed-loop-process control of the governing process.

In the methods of the invention, a specimen (or a portion of a specimen) or bulk material is encircled by an induction sensor having coplanar magnetizing and sensor coils. The specimen or material completes a coupling between the magnetizing and sensor coils. When the magnetizing coil magnetizes a coplanar portion of the specimen or material, the resulting voltage is detected/captured by the sensor coil. The captured voltage can then be decomposed into its real and imaginary electrical components, which, in turn, reflect magnetic and electrical properties of the specimen or material. This magnetization and sensing process can be repeated for multiple planes by shifting the encircling sensor or by shifting the specimen or material. Alternatively, data for multiple planes may be obtained through the use of a plurality of parallel sensors surrounding the specimen or material. In typical AM applications, the induction sensors are arranged horizontally. AM build parts can be examined in situ within the build chamber as they are constructed by a single sensor arranged to surround the parts at the build plane or by multiple sensors arranged to surround multiple layers of the build parts as they are constructed.

Complex impedance plane test coil(s) may be applied to or integrated into traditional build chambers and/or feedstock material containers. They may also be used separately as a stand-alone inspection system for raw material feedstock (e.g., powder) or for final parts.

In-situ monitoring of build parts would be set to establish either a pulsed or cyclic demagnetization of test components by inducing variable frequency magnetized field and subsequently capturing pulsed or continuous magnetic flux density, which are a combined function of the intrinsic physical, magnetic, and electric properties of the test part, thus affecting its bulk magnetization characteristics at different test frequencies. Application of correction factors resulting from in-situ operating conditions (e.g., temperature, density, flaws, imperfections, material variation, localized stresses, atmospheric contaminants, ambient environment, etc.) are considered in this method along with other monitored conditions (temperature, material, process, etc.) that could affect the magnetic fields of the component or material being measured.

In this method, in-situ impedance measurement (or bulk impedance measurement) is measured in free space (e.g., the build chamber) and then compared to the referenced material or part build space to determine the complex magnetic impedances characteristics of the part under different magnetization frequencies in the specimen under analysis. This method also determines the highest magnitude in the detected flux density signal. The pulsed excitation occurs over multiple distinctive frequency and harmonic attenuation settings to investigate inconsistencies in the metallic structure of the material. These inspections can also occur pre or post heat treatments, stress relieving, hot-isostatic pressing, etc. A plurality of coils enables individual in-situ monitoring on a layer-by-layer basis or as a bulk inspection of the material or part. Additionally, this method of complex impedance plane measurement of the bulk material integral with the material delivery system (e.g., raw material feedstock chamber) can serve to provide in-situ or post-build verification of the raw material feedstock analysis beyond traditional sieving processes.

Magnetizing coils are selected to provide both a uniform and constant magnetic field for the bulk or as an individual portion of the respective build chamber being monitored. Analysis of the low and intermediate frequency excitation pulses results from integral test coils can also be used for in-process visualization and/or in-situ build quality monitoring. Low-level skin effects at low and intermediate frequencies can further be used (or overlaid with other digital data such as the part three-dimensional geometry) to identify part flaws or inconsistencies. High frequency test results further augment in-situ or bulk measurement results of the material or part analysis. This method may require the user to test the magneto-inductive characteristics of either the part, material or raw feedstock material at various test frequencies to evaluate the magnetic and electric properties. Additional considerations for the chamber material (metallic or non-metallic) are also considered as part of setup configurations and/or results analysis based on the material and/or geometric considerations (e.g., part shapes that can affect the materials magnetic properties). Tailor of in-situ inspection frequencies (pulsed or continuous) under magnetization considers both the component and/or material.

It will be understood that test frequencies can be varied and data for any given layer can be obtained at multiple frequencies. In a typical inspection scenario, the frequency may be varied from 5 Hz to 500 kHz (or higher) for each layer. For each frequency, a different impedance plane map is captured and recorded. A series of maps can be captured and statistically evaluated to develop various elliptical loci. These are based on statistical distribution trends of corresponding complex magnetic signatures for a given part. By adjusting different test frequencies, harmonics and attenuation settings, a district clustering of each locus is developed and used for NDT test deductions.

The methods and apparatus of the invention may also be used to evaluate variations in the eddy current and skin effects (e.g., flux damping) at various frequencies to assess the part magnetic permeability and electrical conductivity (in-situ layer-by-layer/per layer or in bulk). The resulting contour plots, captured at different test frequencies and the corresponding electromagnetic features captured are indicative of patterns seen in the complex impedance plane which are analyzed to assess their variation distribution loci. This analysis takes into consideration the magnitude and corresponding phase angles for the part or material being measured/analyzed. Results are analyzed through traditional statistical measurement tools to develop boundary contours of the scattered data points at a fixed divination value. Calculations are performed at the selected test frequencies and benchmarked against chamber calibration or other test data. The resulting magneto-inductive test data results are compared to the scatter limits identified by the boundary contour limits.

These resulting conditions can further be used and monitored in-process to perform feed-forward/feed-back/closed loop control and in-process adjustments of additive process variables such as energy input, travel speeds, layer adjustments, environmental conditions, raw material packing and/or re-layering, etc.

Embodiments of the present invention can also be used for surface induced eddy current defect detection. This is accomplished by magnetizing the surface of the test specimen and scanning it using one or more eddy current probes. For scanning purposes, either the part or the sensor is traversed and/or rotated to allow the probe to follow the contour of the surface. The scanning arrangement can incorporate either one test track along the sample with a single probe or several test tracks with an array of probes arranged in parallel. Alternatively, the surface to be tested can be scanned with a probe that tracks its contour. The technique uses a pre-defined air gap clearance, and a magnetization profile is selected based on the test part shape profiles and contours. The probes used may depend on the geometry of the component, the cycle time, and the defect specification. The technique can be used for localized surface and subsurface non-destructive testing but may have limited uses in bulk non-destructive testing or with parts with complex shapes and geometries.

The present invention contemplates a variety of applications including, but not limited to:
  In-situ inspection/monitoring of AM parts and feed-forward/feed-back/closed-loop-control and/or adjustment of additive manufacturing processes by bulk measurement during or between AM process steps;
  In-situ inspection/monitoring of AM parts and feed-forward/feed-back/closed-loop-control and/or adjustment of additive manufacturing processes on a layer-by-layer basis during or between AM process steps;
  Combined in-situ monitoring of AM parts and raw material during or between AM process steps;
  Stand-alone bulk inspection (e.g., as a portable or independent) analysis of AM parts or raw material;
  Stand-alone inspection (e.g., as a portable or independent) analysis of AM parts or raw material at a layer-by-layer level;
  Generalized inspection of AM parts/material using Complex Impedance Plane Analysis;
  Integration with recoater or powder application systems for analysis of AM processes on a layer-by-layer basis;
  Integration with powder supply and/or recovery systems for monitoring of AM feedstock conditions and processing; and
  In-situ inspection/monitoring during or between AM process steps solely for feed-forward/feed-back/closed loop process control.

Exemplary embodiments for use in the above and other applications are described in the following paragraphs with reference to the generalized additive manufacturing system 10 described above. It will be understood that the systems and methods of the invention are applicable to other AM and complex non-AM systems as well.

Figure 2:
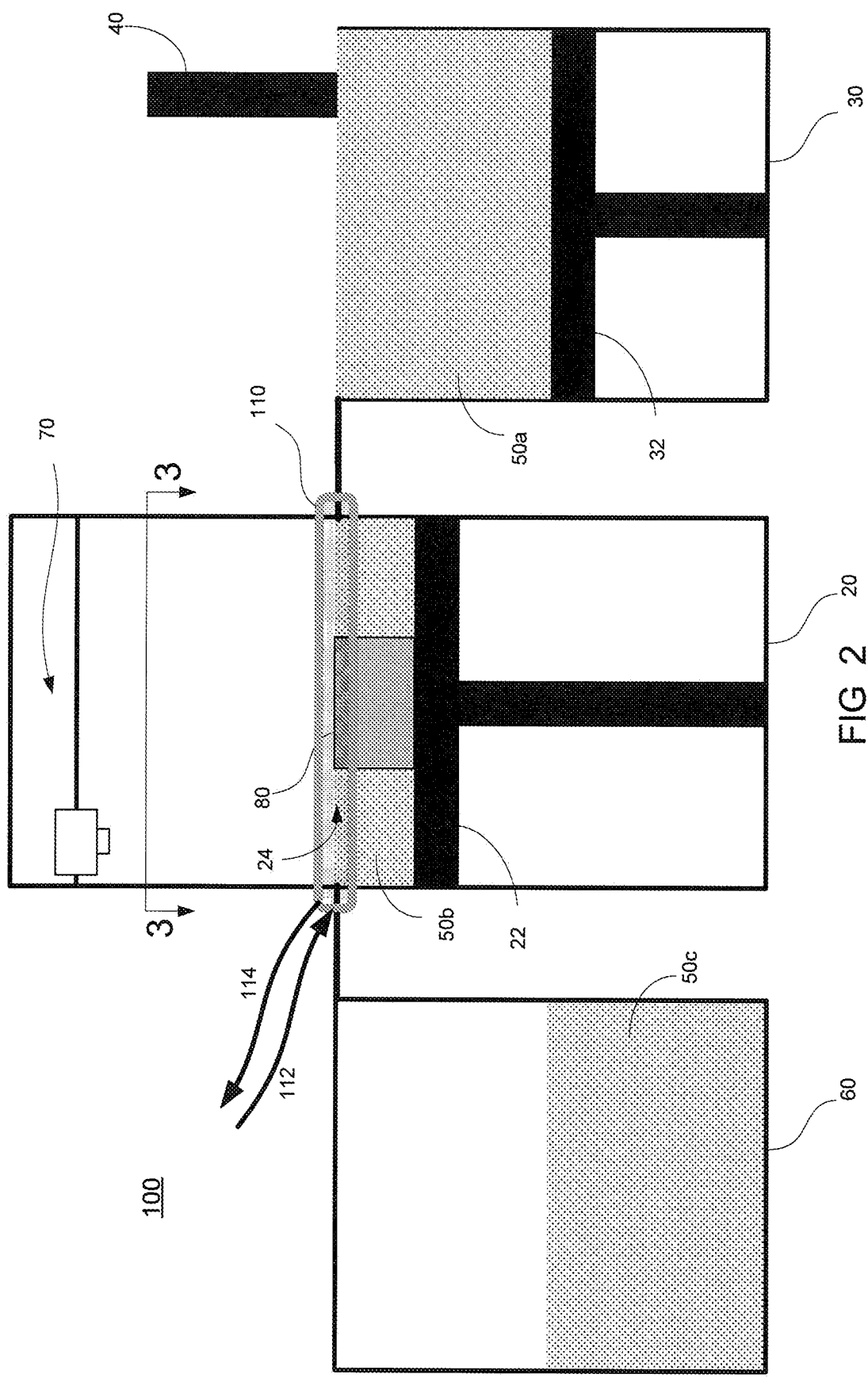
FIG. 2 is a schematic representation of a magnetic induction inspection arrangement according to an embodiment of the invention in conjunction with the AM system of FIG. 1.
Figure 3:
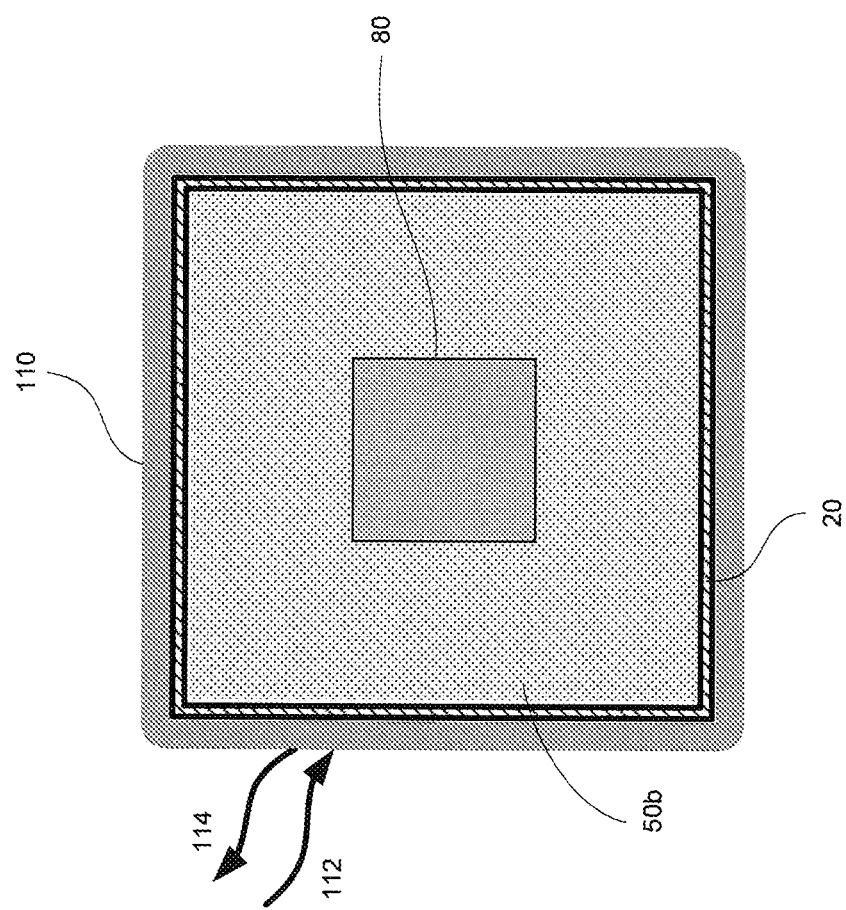
FIG. 3 is a section view of the magnetic induction inspection system and AM system of FIG. 2.

FIGS. 2 and 3 depict a schematic representation of an magnetic induction inspection arrangement 100 for use in conjunction with the exemplary AM system 10 of FIGS. 1a-1d according to an illustrative embodiment of the invention. The arrangement 100 comprises an induction coil sensor 110 configured to surround or be incorporated into the walls of the build chamber 20 (or process area). The induction coil sensor 110 is configured and positioned so that it can induce and monitor currents in material disposed in the build plane 24. This positioning allows the monitoring of the raw material 50b prior to energization and both the raw material 50b and the latest added layer of the AM part (or parts) 80 after energization. Input and output interface cables 112, 114 are provided to allow communication of data between the sensor 110 and a control system (not shown) configured for controlling the AM process.

Figure 5:
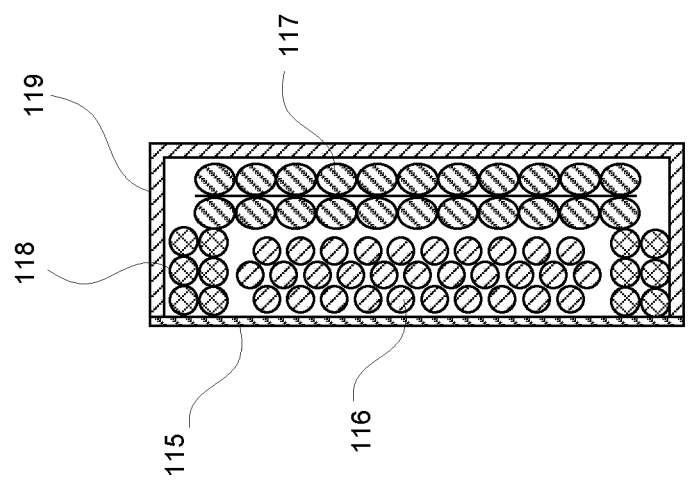
FIG. 5 is a cross-sectional view of the magnetic induction sensor of FIG. 4.
Figure 4:
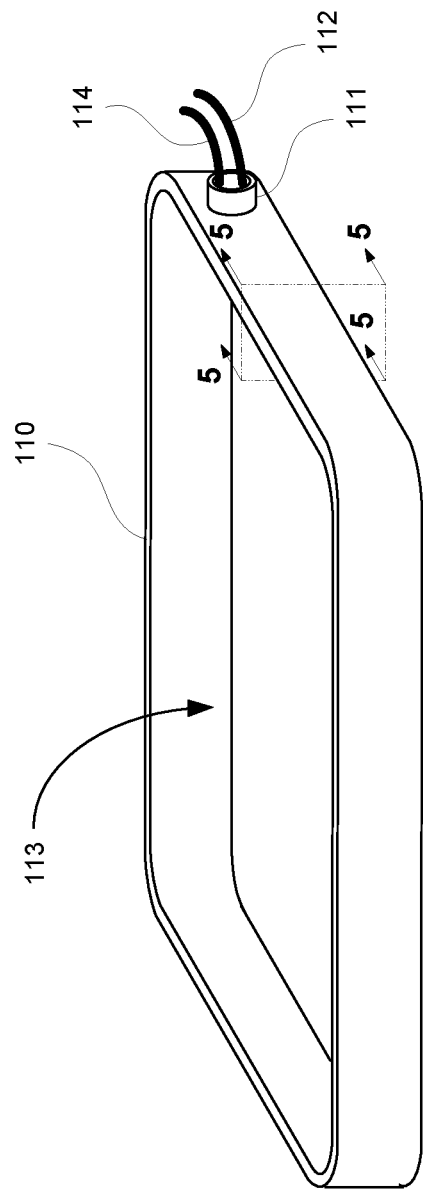
FIG. 4 is a perspective view of a magnetic induction sensor according to an embodiment of the invention.

An exemplary induction coil sensor 110 is shown in more detail in FIGS. 4 and 5. As shown in the section view of FIG. 5, the sensor 110 comprises an outer winding 117 that is configured as the excitation or magnetization (or magnetic field) coil and an inner winding 116 configured as the sensor or pick-up (or magnetic flux disunity) coil. The type of wire used for the inner and the outer coils may be selected according to the test current rating and the intended test frequency range. A typical frequency range for AM materials of interest may be 5 Hz to 500 kHz. In some applications, frequencies above or below this range may be used.

The highly dense coils 116, 117 are wound on a non-magnetic former 117 defining a passage 113 in or through which a test part may be disposed. The former 117 may be circular, square or other shape to accommodate, for example, the foot print of a particular part or the cross section of a build chamber. The non-magnetic former 117 combines with a non-magnetic casing 119 to form a housing fully enclosing the coils 116, 117. The casing 119 could optionally include or house compensation shielding to correct flux fringing at the edge of the passage 113 at different magnetization and frequencies. Optionally, additional thin compensation coils 118 could be included adjacent the upper and lower sides of the non-magnetic casing to correct/regulate the field profile within the passage 113.

Figure 6:
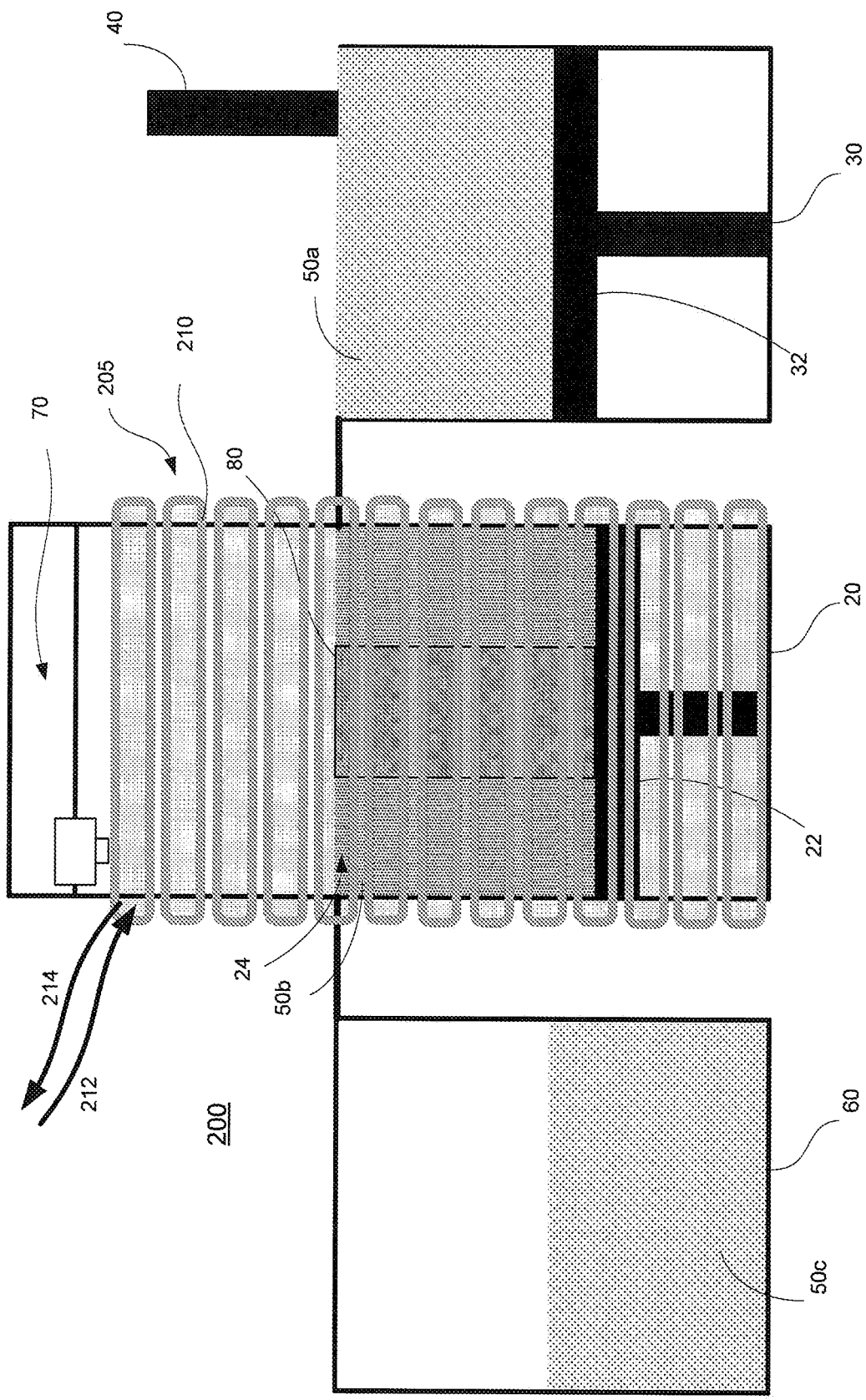
FIG. 6 is a schematic representation of a magnetic induction inspection arrangement according to an embodiment of the invention in conjunction with the AM system of FIG. 1.

FIG. 6 provides a schematic representation of a magnetic induction inspection arrangement 200 for use in conjunction with the exemplary AM system 10 of FIGS. 1a-1d according to an illustrative embodiment of the invention. The arrangement 200 comprises an induction coil sensor arrangement 205 comprising a plurality of induction coil sensors 210, which may be the same as or similar to the sensor 110 illustrated in FIGS. 4 and 5. Each induction coil sensor 210 is configured and positioned to surround or be incorporated into the walls of the build chamber 20 (or process area). The induction coil sensors 210 are vertically spaced at regular intervals to allow induction and monitoring of currents in materials at spaced apart planes throughout the build chamber 20. These planes would preferably include the build plane 24. The use of multiple coil sensors 210 allows the monitoring of the entire build part (or parts) at any stage of construction. The coil arrangement 205 includes input and output cabling 212, 214 for communication with a central control system.

Figure 7:
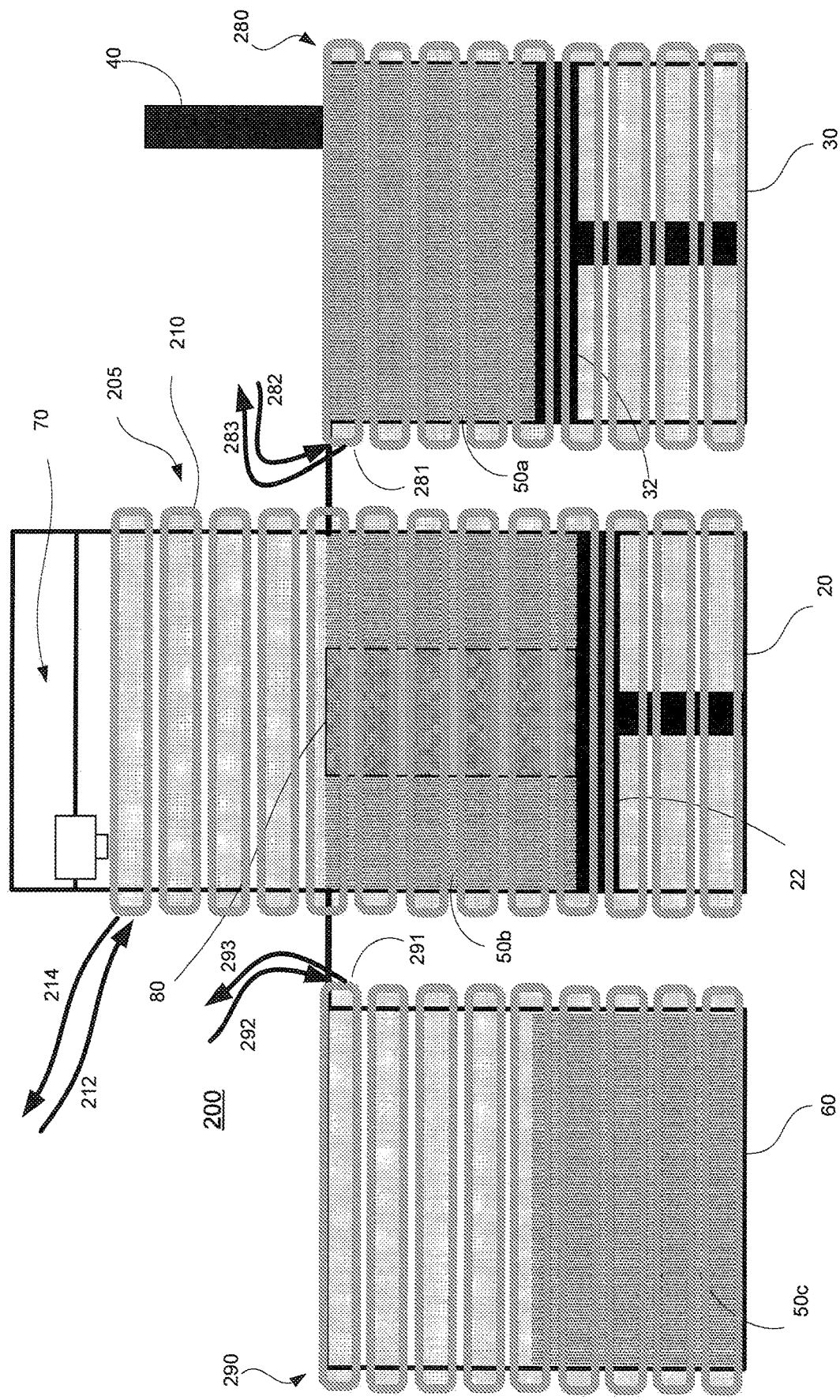
FIG. 7 is a schematic representation of a magnetic induction inspection arrangement according to an embodiment of the invention in conjunction with the AM system of FIG. 1.

FIG. 7 illustrates optional additional induction coil sensor arrangements 280, 290 that can be used to monitor/inspect material in the feed stock/raw material container 30 and the raw material collection container 60. The sensor arrangement 280 comprises a plurality of induction coil sensors 281 configured and positioned to surround or be incorporated into the walls of the raw material container 30. The induction coil sensors 281 may be similar to the sensor 110 illustrated in FIGS. 4 and 5. The induction coil sensors 281 are vertically spaced at regular intervals to allow induction and monitoring of currents in the raw material 50a at spaced apart planes throughout the container 30. The sensor arrangement 280 includes input and output cabling 282, 283 for communication with the central control system. The sensor arrangement 290 comprises a plurality of induction coil sensors 291 configured and positioned to surround or be incorporated into the walls of the raw material collection container 60. The induction coil sensors 291 may be similar to the sensor 110 illustrated in FIGS. 4 and 5. The induction coil sensors 291 are vertically spaced at regular intervals to allow induction and monitoring of currents in the collected material 50c at spaced apart planes throughout the container 60. The sensor arrangement 290 includes input and output cabling 292, 293 for communication with the central control system.

It will be understood that either or both of the induction coil sensor arrangements 280, 290 could be applied to the containers 30, 60 independently of (or without the use or incorporation of) the build chamber coil arrangement 205. It will also be understood that similar sensor arrangements may be used for any powder material container. These or similar induction coil sensors can also be used to inspect flowing raw material either inside the AM machine or by an external inspection system (e.g., gravity fed channels).

Figure 8:
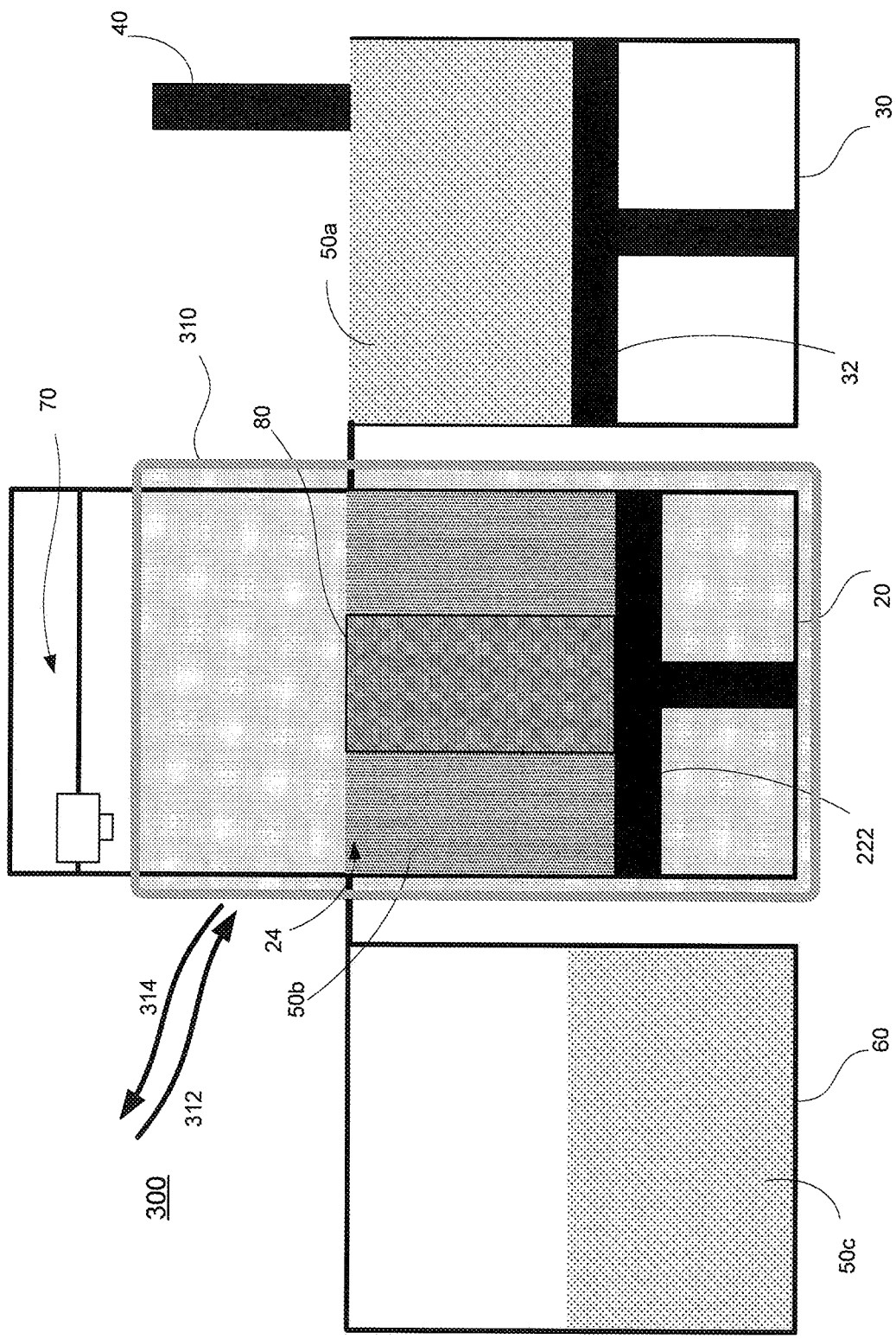
FIG. 8 is a schematic representation of a magnetic induction inspection arrangement according to an embodiment of the invention in conjunction with the AM system of FIG. 1.

FIG. 8 provides a schematic representation of a magnetic induction inspection arrangement 300 for use in conjunction with the exemplary AM system 10 of FIGS. 1a-1d according to another illustrative embodiment of the invention. The arrangement 300 comprises a single induction coil 310 configured to surround or be incorporated into the walls of the build chamber 20. The induction coil 310 is configured and positioned so that it can induce and monitor currents in material disposed virtually anywhere in the interior of the build chamber 20. The induction coil 310 can monitor all of the raw material 50b and the entire build part (or parts) 80 prior to and after energization to fuse the latest added layer of the build part 80. Input and output interface cables 312, 314 are provided to allow communication of data between the coil 310 and a control system (not shown) configured for controlling the AM process. These or similar coils can also be used to inspect flowing raw material either inside the AM machine or by an external inspection system (e.g., gravity fed channels).

An exemplary induction coil sensor 310 is shown in more detail in FIGS. 9 and 10. As shown in the section view of FIG. 5, the sensor 310 comprises an outer winding 317 that is configured as the excitation or magnetization (or magnetic field) coil and an inner winding 316 configured as the sensor or pick-up (or magnetic flux disunity) coil. The type of wire used for the inner and the outer coils may be selected according to the test current rating and the intended test frequency range. A typical frequency range for AM materials of interest may be 5 Hz to 500 kHz.

The highly dense coils 316, 317 are wound on a non-magnetic former 317 defining a passage 313 in or through which a test part may be disposed. The former 317 may be circular, square or other shape to accommodate, for example, the foot print of a particular part or the cross section of a build chamber. The non-magnetic former 317 combines with a non-magnetic casing 319 to fully enclose the coils 316, 317. The casing 319 could optionally include or house compensation shielding to correct flux fringing at the edge of the passage 313 at different magnetization and frequencies. Optionally, additional thin compensation coils 318 could be included adjacent the upper and lower sides of the non-magnetic casing to correct/regulate the field profile within the passage 313.

Figure 11:
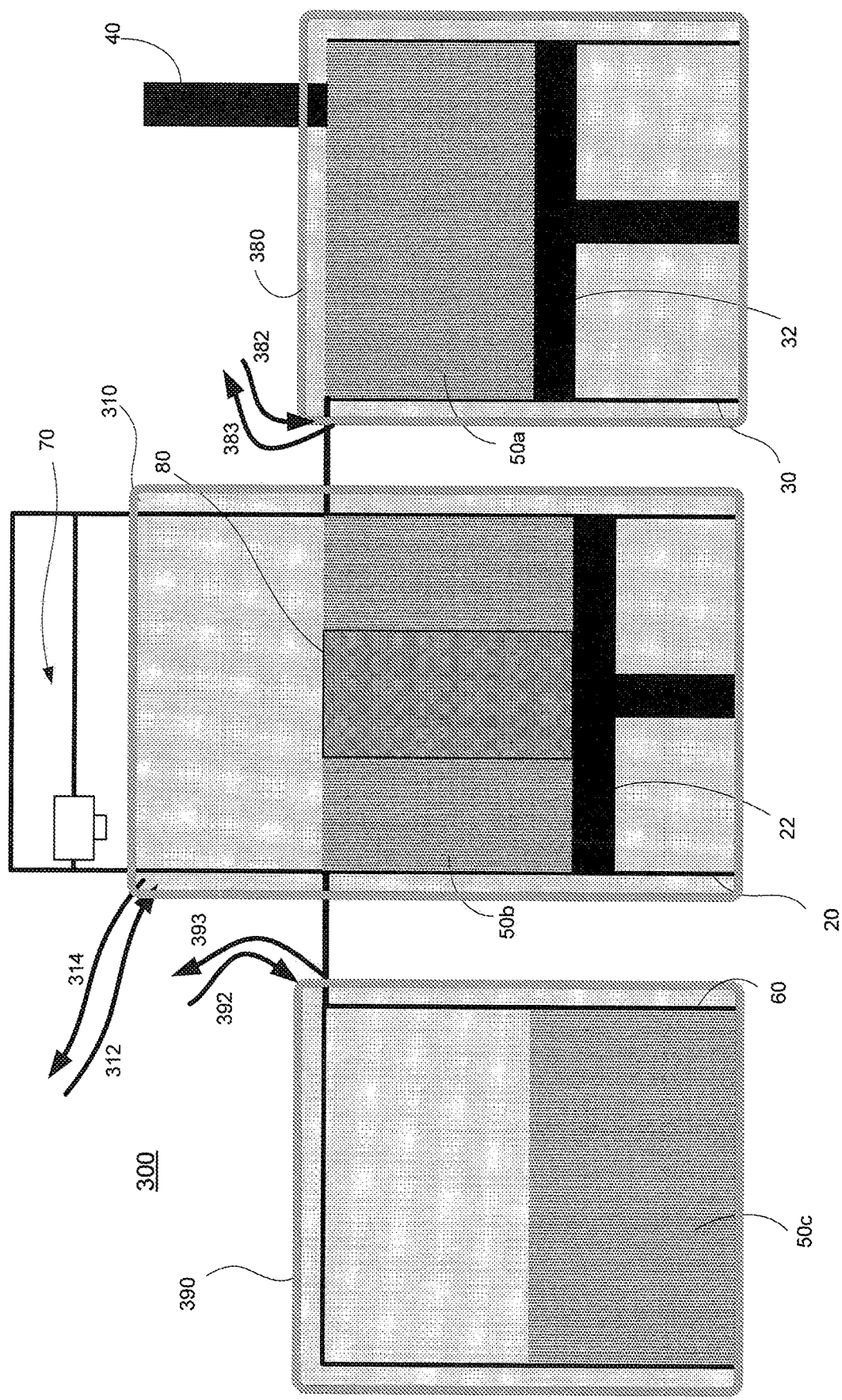
FIG. 11 is a schematic representation of a magnetic induction inspection arrangement according to an embodiment of the invention in conjunction with the AM system of FIG. 1.

FIG. 11 illustrates optional additional induction coil sensors 380, 390 that can be used to monitor/inspect material in the feed stock/raw material container 30 and the raw material collection container 60. Induction coil sensor 380 is configured and positioned to surround or be incorporated into the walls of the raw material container 30. The induction coil sensor 380 is configured for bulk induction and monitoring of currents in the raw material 50*a* throughout the container 30. The sensor 380 includes input and output cabling 382, 383 for communication with the central control system. Induction coil sensor 390 is configured and positioned to surround or be incorporated into the walls of the raw material collection container 60. The induction coil sensor 390 is configured for bulk induction and monitoring of currents in the collected material 50*c* throughout the container 60. The sensor 390 includes input and output cabling 392, 393 for communication with the central control system.

Either or both of the additional induction coil sensors 380, 390 may be similar to the sensor 310 illustrated in FIGS. 9 and 10. It will be understood that either or both of the above-described sensors 380, 390 could be applied to the containers 30, 60 independently of (or without the use or incorporation of) the build chamber coil 310. It will also be understood that similar coil sensors may be used for any powder material container.

Figure 12:
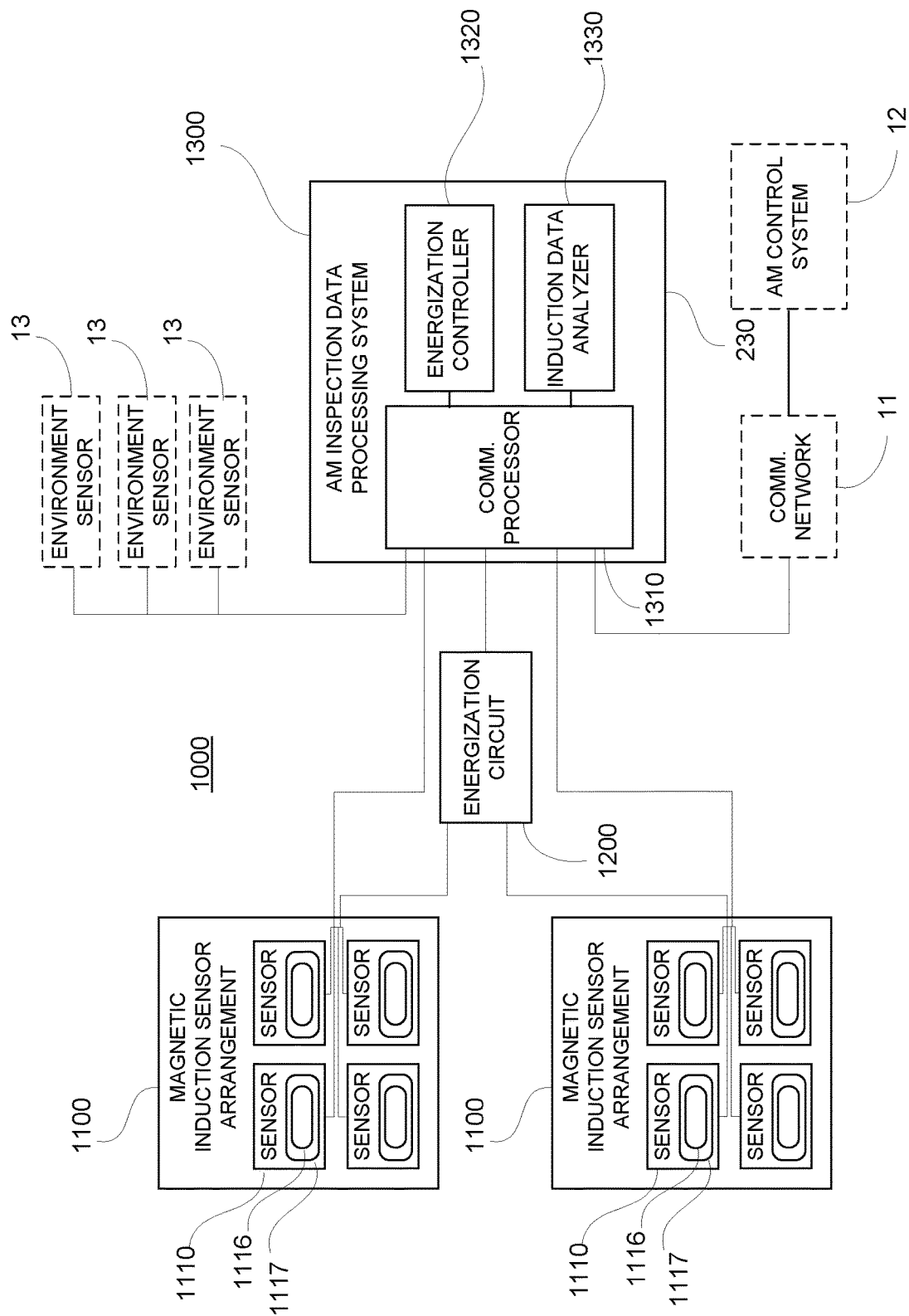
FIG. 12 is a block diagram of an AM inspection system according to an embodiment of the invention.

The various magnetic induction inspection arrangements of the invention may be incorporated into an AM inspection system that includes a central data processing and control system that may be configured to interface with the control system of the AM apparatus. FIG. 12 provides a schematic illustration of an exemplary AM inspection system 1000 according to an embodiment of the invention. The inspection system 1000 includes one or more induction inspection arrangements 1100, an energization circuit 1200, and a data processing system 1300. Each induction inspection arrangement comprises one or more induction coil sensors 1110 comprising a magnetization coil 1117 in communication with the energization circuit 1200 and a sensor coil 1116. The energization circuit 1200 is configured for selectively energizing the magnetization coil 1117 in accordance with commands received from the data processing system 1300.

The data processing system 1300 comprises a communication processor 1310 configured for communication with the energization circuit 1200 and the induction coil sensors 1110. In some embodiments, the communication processor 1310 may also be configured for communication with a control system 12 of an AM apparatus. In such embodiments, communication between the communication processor 1310 and the AM control system 12 may be over a wireless or other network 11. The communication processor 1310 may also be in communication with and configured for receiving sensor data (e.g., ambient temperature in the AM build chamber) from environmental sensors 13. The data processing system 1300 also comprises an energization controller 1320 and an induction data analyzer 1330. The energization controller 1320 is configured to determine energization commands for transmission to the energization circuit 1200. The induction data analyzer 1330 is configured for receiving and processing induction data captured by the sensor coil 1117. The induction data analyzer 1330 may also be configured for determining induction characteristics of an AM build part and comparing them to expected or desired characteristics to identify structural anomalies in the build part. Expected impedance characteristics may be determined through digital simulations of the build part or from a database of previously obtained experimental data. As used herein, the term "anomaly" means any measured or observed characteristic that departs from an expected characteristic. In some embodiments, the system may be configured to identify anomalies based on a measured value (or values) departing from a mean expected value by a predetermined amount or percentage. The build part induction characteristics and/or anomaly information may be communicated to or may be used to generate instructions for the AM control system 12.

It will be understood that the data processing system 1300 may be in the form of a computer or computer system. The term "computer system" or "operating system" is to be understood to include at least one processor utilizing a memory or memories. The memory stores at least portions of an executable program code at one time or another during operation of the processor. In addition, the processor executes various instructions included in that executable program code. An executable program code means a program in machine language or other language that is able to run in a particular computer system environment to perform a particular task. The executable program code process data in response to commands by a user. As used herein, the terms "executable program code" and "software" are substantially equivalent.

It should also be appreciated that to practice the systems and methods of the invention, it is not necessary that the processor, or portions of the processor, and/or the memory, or portions of the memory be physically located in the same place or co-located with the instrumented body. Each of the processor and the memory may be located in geographically distinct locations and connected so as to communicate in any suitable manner, such as over a wireless communication path, for example. Each of the processor and/or the memory may also be composed of different physical pieces of equipment. It is not necessary that the processor be one single piece of equipment in one location and that the memory be another single piece of equipment in another location. The processor may be two pieces of equipment in two different physical locations connected in any suitable manner. Additionally, each respective portion of the memory described above may include two or more portions of memory in two or more physical locations, including or utilizing memory stores from the Internet, an Intranet, an Extranet, a LAN, a WAN or some other source or over some other network, as may be necessary or desired.

Figure 13:
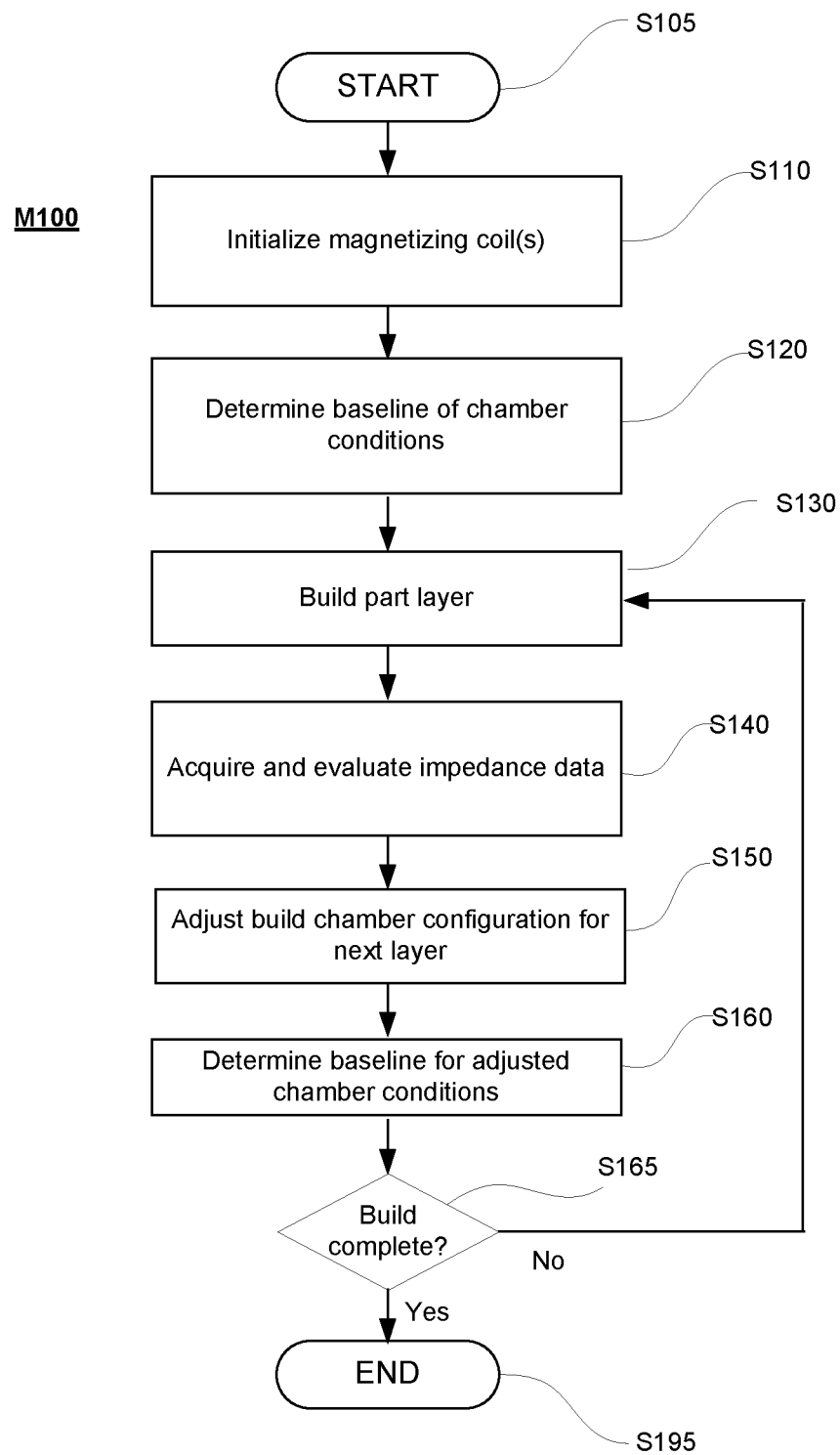
FIG. 13 is a flow diagram of a method of additive manufacturing and inspection according to an embodiment of the invention.

The above-described embodiments can be used to carry out various methods of inspection. FIG. 13 provides a flow diagram of an illustrative method M100 of manufacturing and inspecting an AM build part during the AM process according to an embodiment of the invention. The method begins at S105. At S110, the induction coil sensor or sensors to be used are initialized. This may include any or all build chamber sensors and/or any or all feedstock/raw material container sensors and/or any or all feedstock recovery container sensors. At S120, the initialized sensors are used to determine the baseline conditions within the build chamber and/or containers. These conditions may be determined at one or more layers or in bulk, depending (at least in part) on the sensor configuration. At S130, raw material feedstock is deposited at the build plane and the AM energization system is activated to fuse the material in the desired two dimensional pattern to form the first (or latest) layer of the build part. At S140, the induction coil sensors are used to acquire impedance data. In the case of build chamber sensors, this preferably includes data for the build plane. Depending on the sensor configuration, this may include layer-by-layer data for other planes as well or may include bulk data. Data from the sensors is transmitted to a central control data processor configured for evaluating the data.

Other data acquired may include build chamber or other relevant environmental conditions, temperature, pressures, etc. At S150, the build platform/chamber are adjusted for construction of the next build layer. In some systems, this will involve lowering the build platform to position the upper surface of the build part to receive the next layer of raw material. At S160, the induction coil sensors are used to determine the baseline conditions for the adjusted platform/chamber configuration. At S165, the AM system determines whether the build part is complete. If it is not, the next layer is built and actions S130-S165 are repeated. If the part is complete, the method ends at S195. It will be understood that the actions S150, S160 may optionally be carried out after the determination is made at S165.

Figure 14:
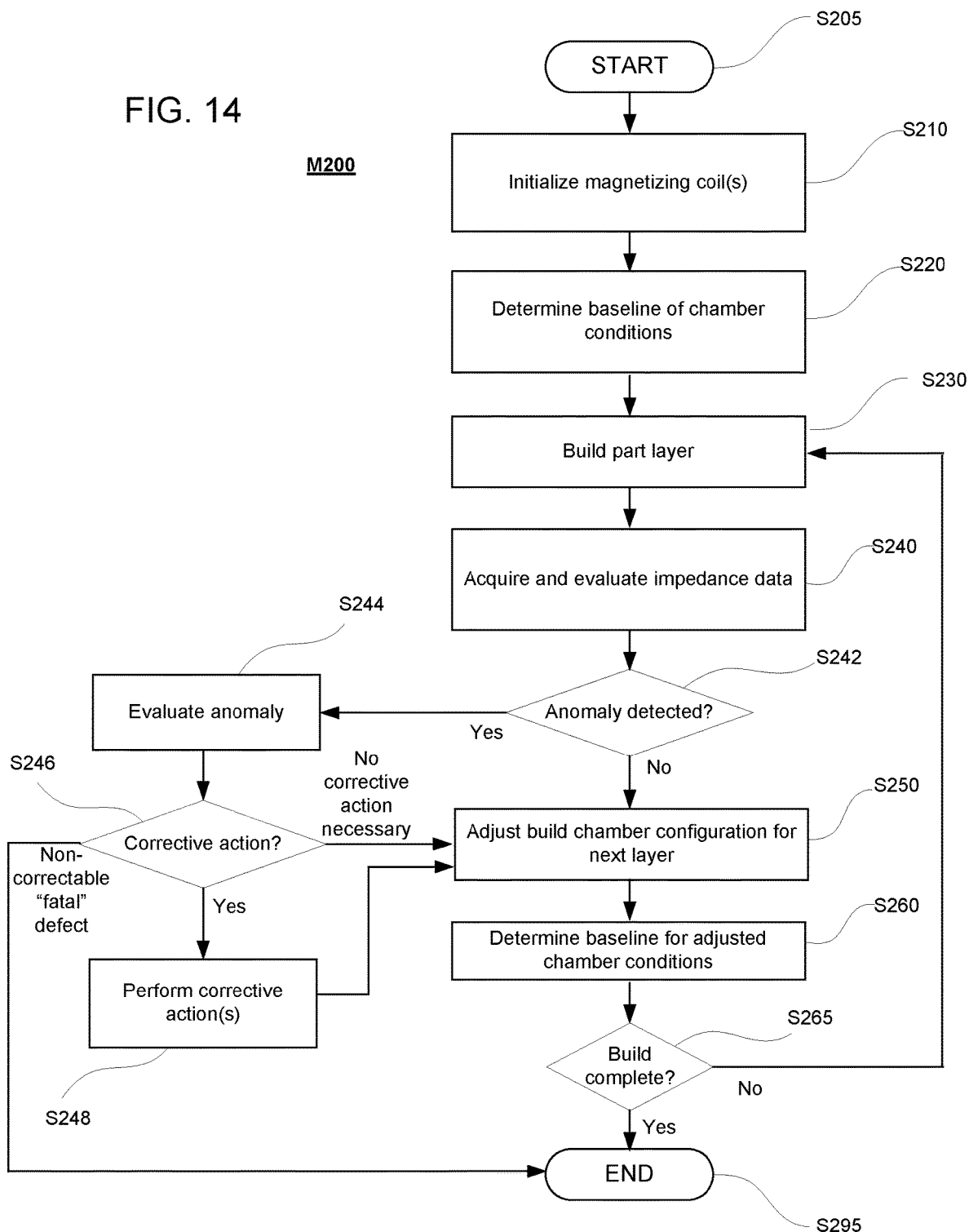
FIG. 14 is a flow diagram of a method of additive manufacturing and inspection according to an embodiment of the invention.

In the above method, evaluation of the sensor data may be used to document potential anomalies after the build is complete or during the build process. FIG. 14 provides a flow diagram of another illustrative method M200 of manufacturing and inspecting an AM build part during the AM process according to an embodiment of the invention. In this method, the process of manufacturing the build part may be adjusted or terminated during the manufacturing process. The method begins at S205. At S210, the induction coil sensor or sensors to be used are initialized. This may include any or all build chamber sensors and/or any or all feedstock/raw material container sensors and/or any or all feedstock recovery container sensors. At S220, the initialized sensors are used to determine the baseline conditions within the build chamber and/or containers. These conditions may be determined at one more layers or in bulk, depending (at least in part) on the sensor configuration. At S230, raw material feedstock is deposited at the build plane and the energization system is activated to fuse the material in the desired two dimensional pattern to form the first (or latest) layer of the build part. At S240, the induction coil sensors are used to acquire impedance data. In the case of build chamber sensors, this preferably includes data for the build plane. Depending on the sensor configuration, this may include layer-by-layer data for other planes as well or may include bulk data. Data from the sensors is transmitted to a central control data processor configured for evaluating the data. Other data acquired may include build chamber or other relevant environmental conditions, temperature, pressures, etc. At S242, the data is evaluated to determine if there is an anomaly (e.g., an internal flaw or deviation from the design configuration). This determination may be made by comparing impedance characteristics determined from sensor data to expected characteristics determined from digital simulations of the build part or from previously obtained experimental data. If there is no anomaly, the build process continues at S250.

If an anomaly is identified, it is further evaluated at S244. This evaluation allows the determination at S246 of whether corrective action should be taken. If it is determined that no corrective action is required, the method continues to S250. If it is determined that corrective action is desirable or required, the corrective action is implemented at S248. Potential corrective actions may include, for example, reapplication of powder and re-energization without adjustment of the platform/chamber configuration. It may also alternatively or in addition include adjustments to be implemented in the construction of the next layer of the build part. After the corrective action(s) are implemented, the method passes to S150 to continue the process.

A determination may also be made at S246 that the anomaly indicates a fatal flaw in the build part that cannot be corrected. In this case, the process may pass directly to termination at S295.

At S250, the build platform/chamber are adjusted for construction of the next build layer. In some systems, this will involve lowering the platform to position the upper surface of the build part to receive the next layer of raw material. At S260, the induction coil sensors are used to determine the baseline conditions for the adjusted platform/chamber configuration. At S265, the AM system determines whether the build part is complete. If it is not, the next layer is built and actions S230-S265 are repeated. Otherwise, the method ends at S295. It will be understood that the actions S250, S260 may optionally be carried out after the determination is made at S265.

The anomalies detected in the methods of the invention can include those associated with processing of parts, raw material pre-mix grade, tooling, and density variations. This may include localized or bulk (surface or subsurface) imperfections caused by:

Coatings and variations in the coatings process (thickness, consistency, composition anomalies and diffusion inconsistencies)
Corrosion and surface depositions
Metallurgical variations in alloy composition
Cracks/flaws/clusters/localized concentrations/voids/cavities/porosities
Mechanical hardness variations
Tensile stress variations
Surface stress/stain variations
Torsional strains variations
Geometrical changes
Geometrical imperfections (e.g., such as burrs)
Density variations
Isotropy variations
Non-uniform annealing variations
Non-uniform heat treatment variations
Contaminations (pre/post/during heat treatment)
Oxidation or any chemical treatments
Anodizing, plating, polishing or machining treatments
Metallurgical phase changes
Magnetic relative permeability
Electrical reactivity
Electrical conductivity
Magnetization variations
Polarization variations
Residual stresses
Chemistry
Microstructure
Surface Defects
Internal Defects The use of magneto-inductive testing at different excitation frequencies in conjunction with the analysis performed on the resultant complex impedance planes, offer a powerful means of scrutinizing the quality of the parts being produced.

Figure 15:
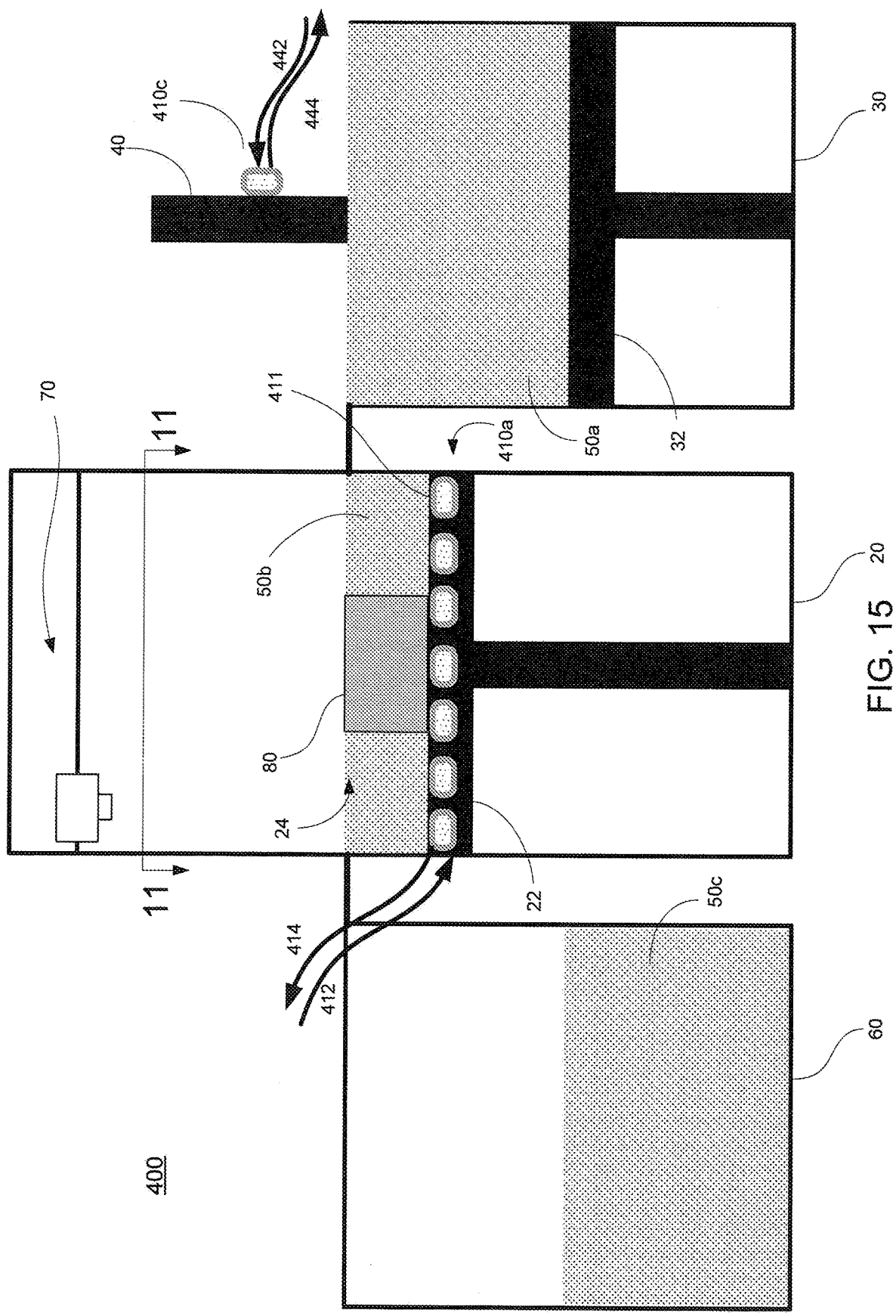
FIG. 15 is a schematic representation of a magnetic induction inspection arrangement according to an embodiment of the invention in conjunction with the AM system of FIG. 1.
Figure 16:
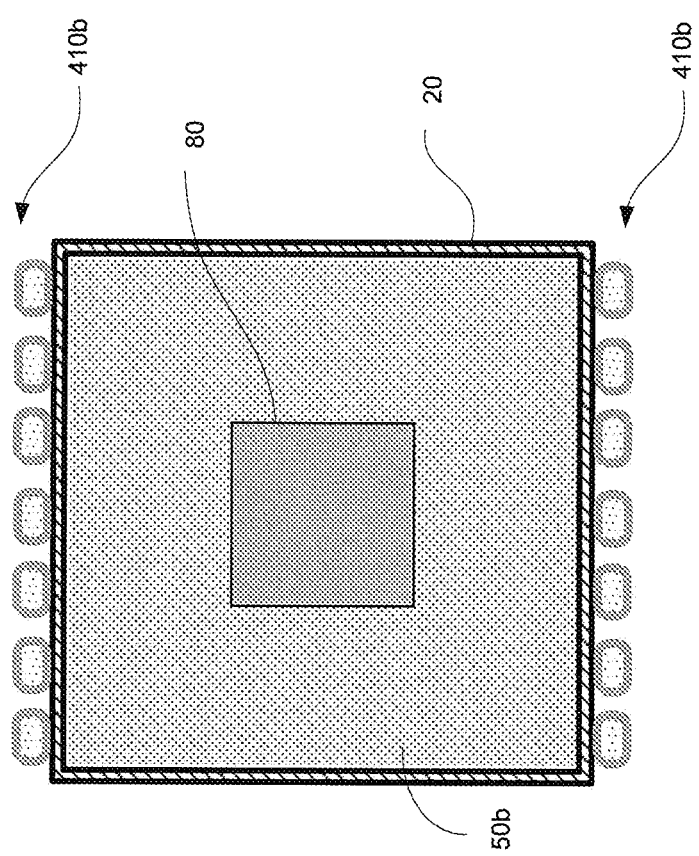
FIG. 16 is a section view of the magnetic induction inspection arrangement and AM system of FIG. 15.

FIGS. 15 and 16 schematically illustrate another exemplary embodiment of a magnetic induction inspection arrangement 400 for use in conjunction with the exemplary AM system 10 of FIGS. 1a-1d. In this embodiment, a horizontal arrangement 410a of partial induction coil sensors 411 is incorporated into the build platform 22. Corresponding vertical arrangements 410b of partial induction coil sensors are positioned outside of or incorporated into opposing vertical walls of the build chamber 20. It can be seen that the horizontal sensor arrangement 410a and the vertical sensor arrangements 410b cooperate to form three sides of a plurality of sensor loops. The arrangement 400 further comprises a single horizontal induction coil sensor portion 410c that may be attached to the deposition device 40. When the deposition device 40 passes through the build chamber 20, it sequentially lines up with and completes each of the partial vertical loops, thereby allowing the induction of currents in the material surrounded by the completed sensor loop. This allows the evaluation of a series of vertical planes throughout the raw material 50b and the build part 80. Similar partial sensor loops could be constructed for the containers 30, 60 as well.

Figure 19:
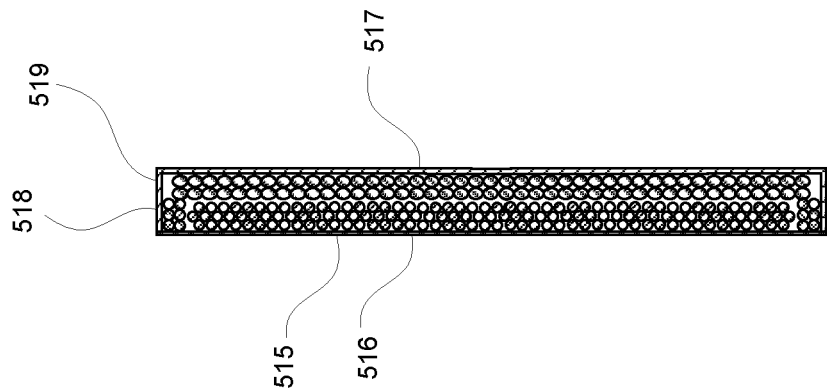
FIG. 19 is a cross-sectional view of the magnetic induction sensor of FIG. 18.

FIGS. 17a-17d illustrate an magnetic induction inspection arrangement 500 according to another embodiment of the invention. The arrangement 500 incorporates a vertically oriented cylindrical (or prismatic) induction coil sensor 510. An exemplary induction coil sensor 510 is shown in more detail in FIGS. 18 and 19. As shown in the section view of FIG. 18, the sensor 510 comprises an outer winding 517 that is configured as the excitation or magnetization (or magnetic field) coil and an inner winding 516 configured as the sensor or pick-up (or magnetic flux disunity) coil. The type of wire used for the inner and the outer coils may be selected according to the test current rating and the intended test frequency range. A typical frequency range for AM materials of interest may be 5 Hz to 500 kHz.

The highly dense coils 516, 517 are wound on a cylindrical, non-magnetic former 517 defining a passage 513 through which a test part may be passed. The former 517 may be circular, square or other shape to accommodate, for example, the foot print of a particular part. The non-magnetic former 517 combines with a non-magnetic casing 519 to fully enclose the coils 516, 517. The casing 519 could optionally include or house compensation shielding to correct flux fringing at the edge of the passage 513 at different magnetization and frequencies. Optionally, additional thin compensation coils 518 could be included adjacent the upper and lower sides of the non-magnetic casing to correct/regulate the field profile within the passage 513.

Figure 17A:
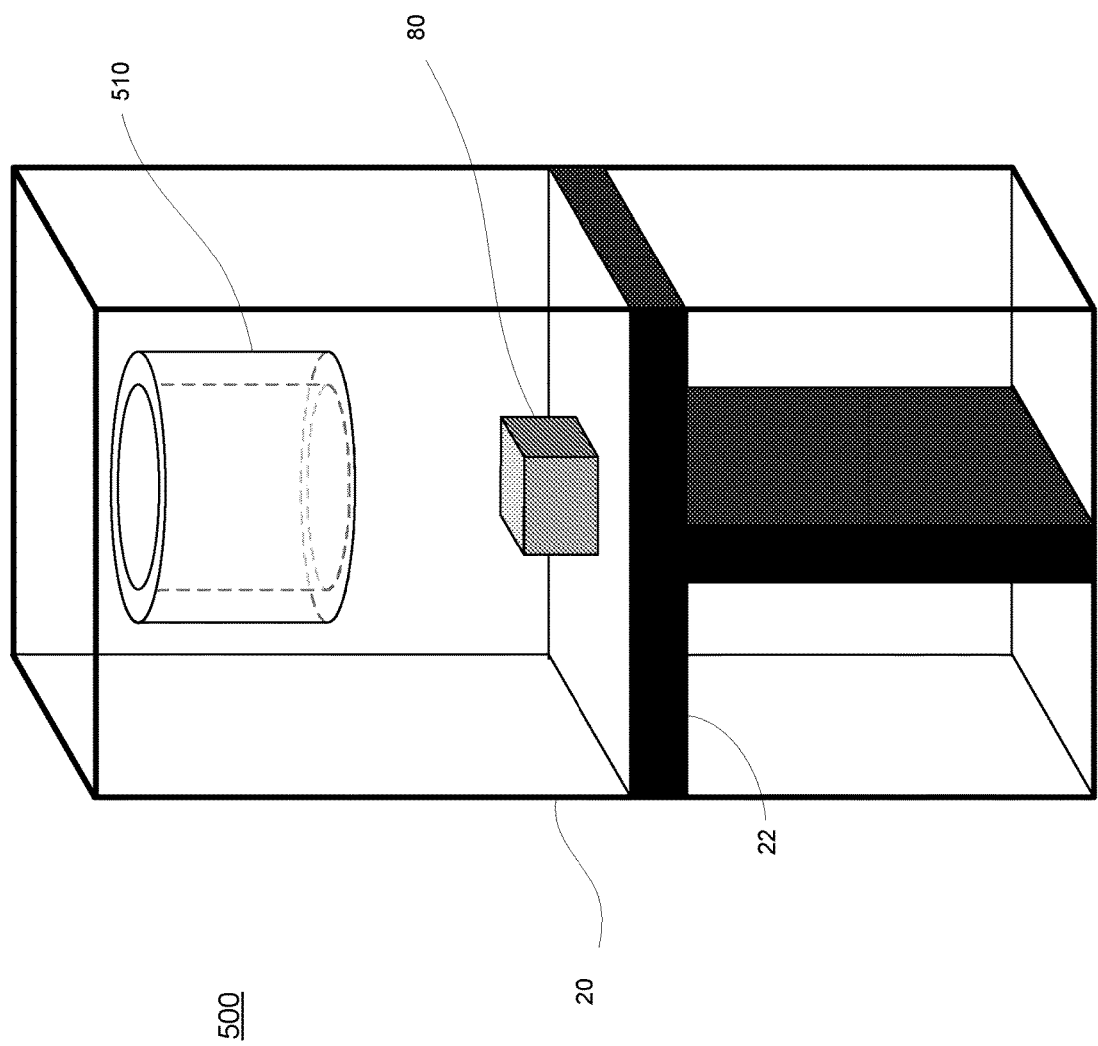
FIGS. 17A, 17B, 17C, and 17D are schematic representations of the operation of a magnetic induction inspection arrangement according to an embodiment of the invention in conjunction with the AM system of FIG. 1.
Figure 17B:
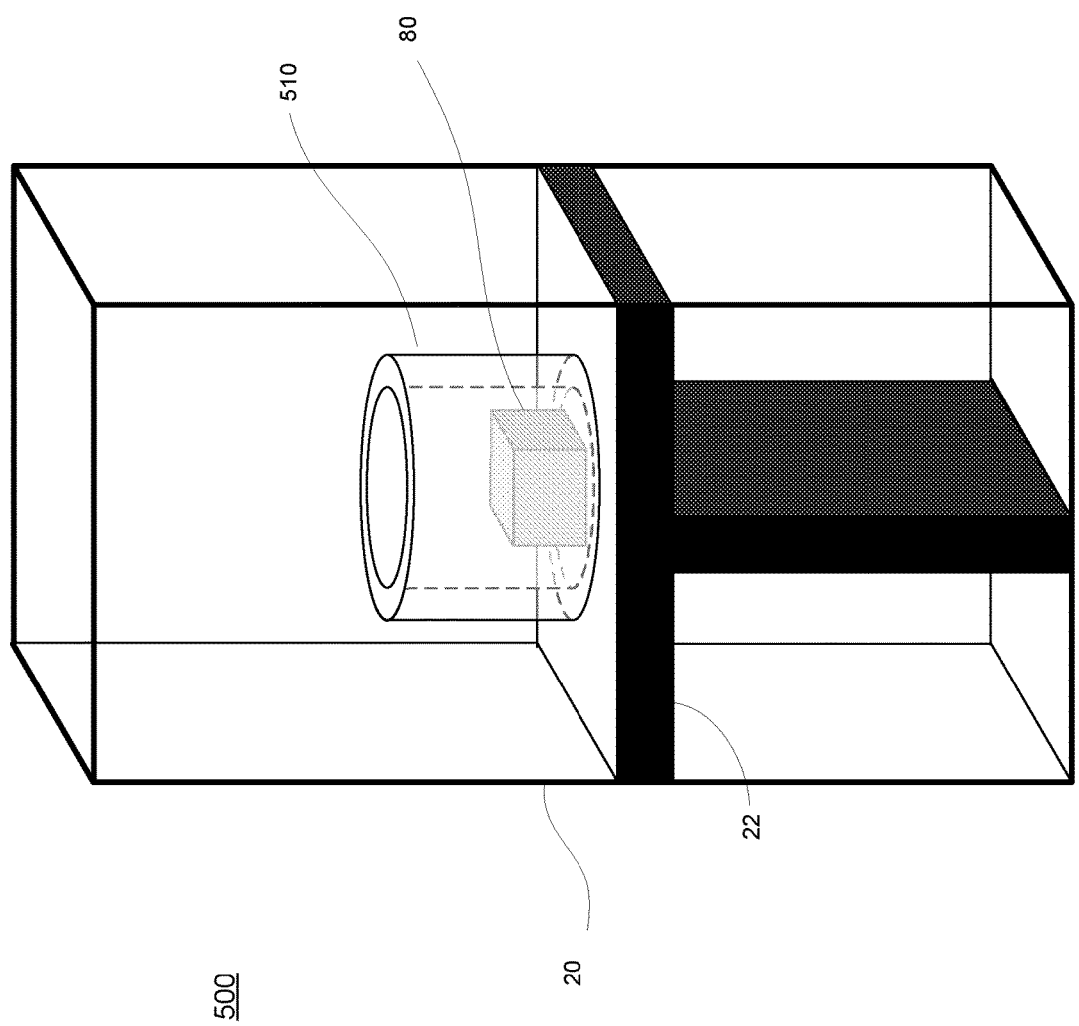
Figure 17C:
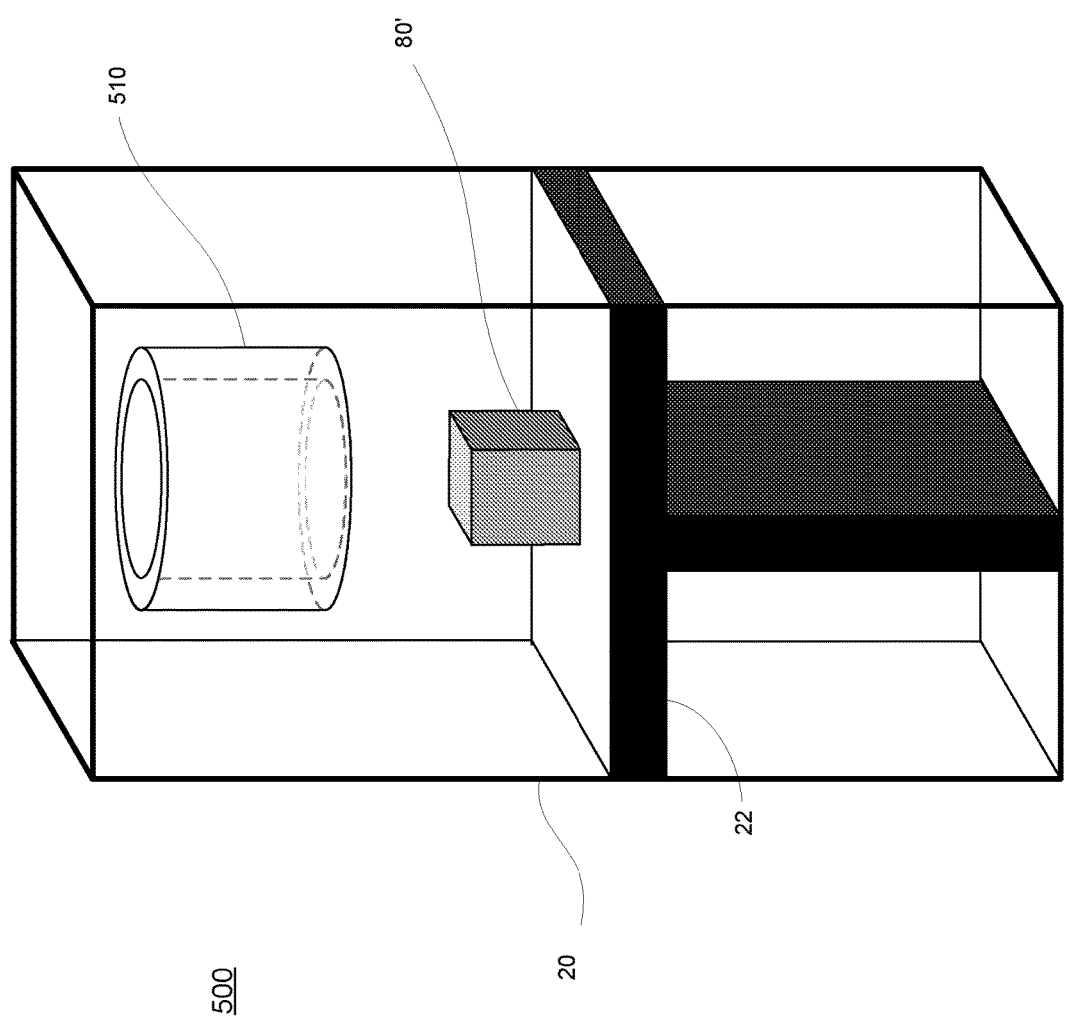
Figure 17D:
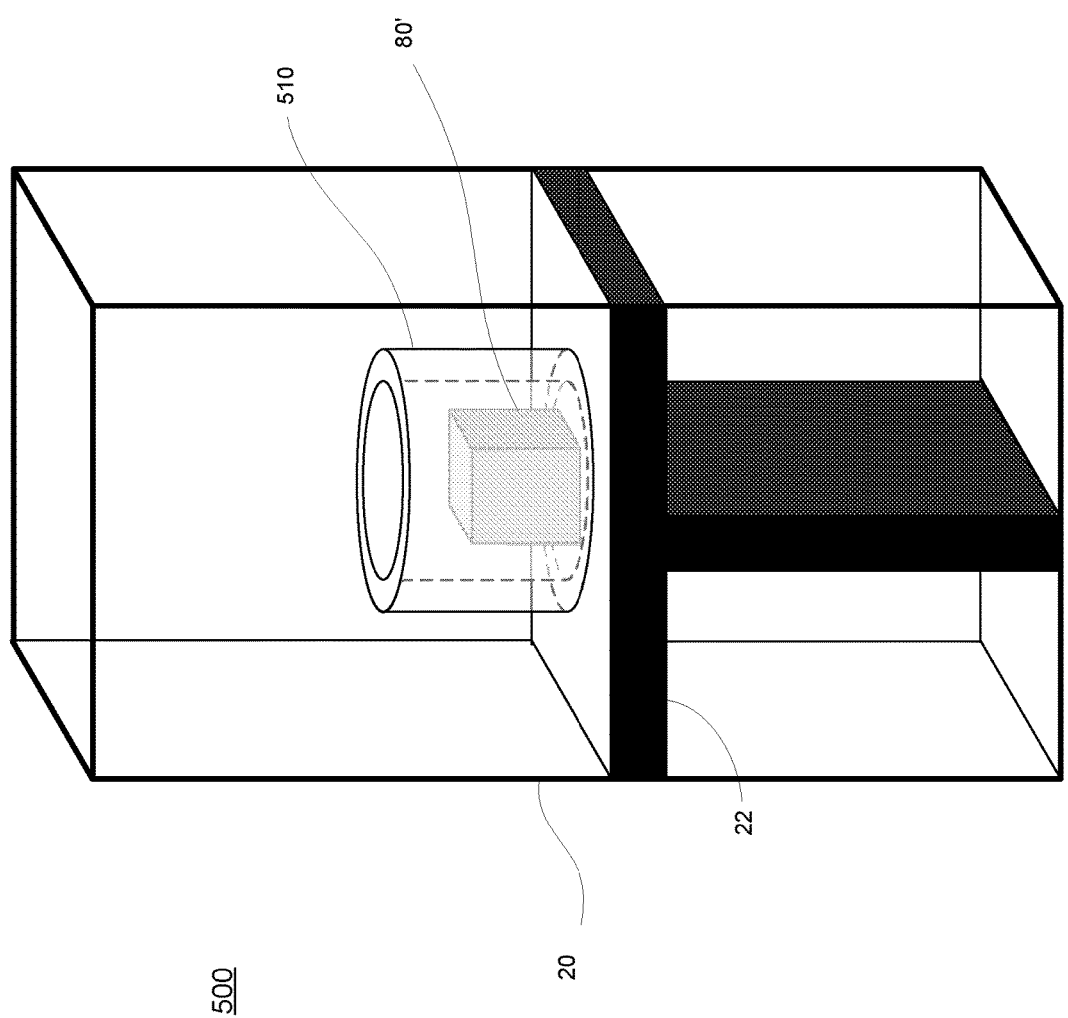
Figure 18:
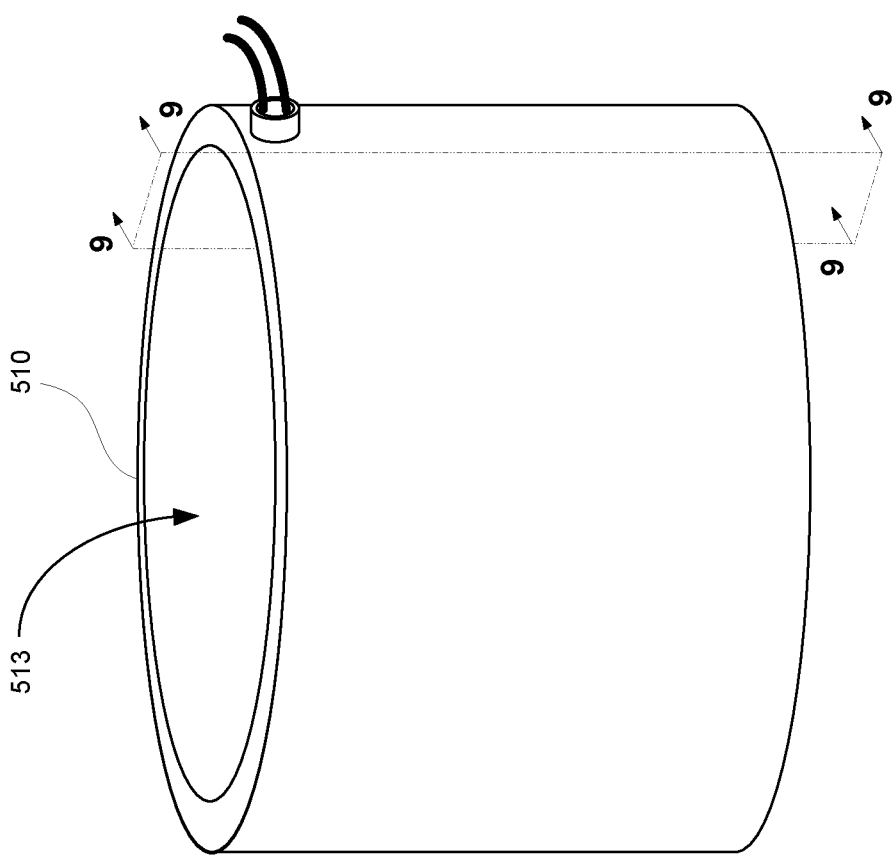
FIG. 18 is a perspective view of a magnetic induction sensor according to an embodiment of the invention.

As shown in FIGS. 17a-17d, the induction coil sensor 510 is configured to be selectively lowered to surround a build part 80, then raised to allow deposition and/or energization of raw material to form a new layer on the part. FIG. 17b, for example, shows the induction coil sensor 510 surrounding the build part 80 to obtain baseline conditions. FIG. 17c shows the sensor 510 raised for the addition of a new layer to form build part 80'. FIG. 17d shows the coil 510 lowered to obtain inspection data for build part 80', including the added layer.

Figure 20:
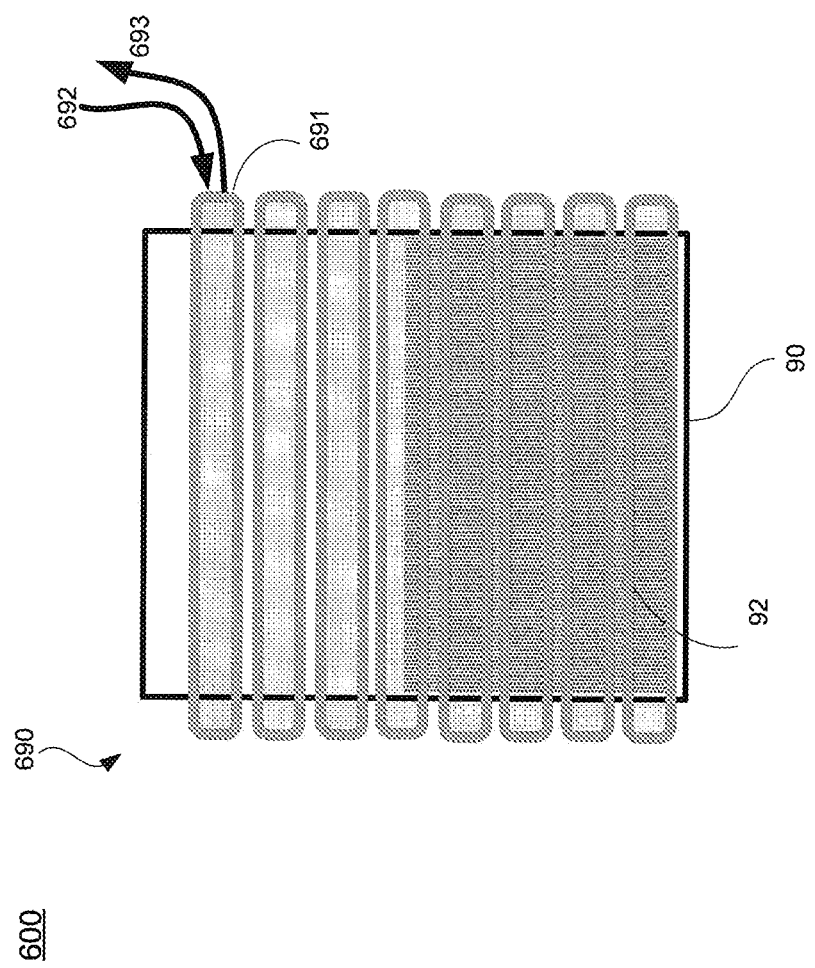
FIG. 20 is a schematic representation of a portable magnetic induction inspection arrangement according to an embodiment of the invention.

FIG. 20 illustrates a stand-alone (and optionally, portable) magnetic induction inspection arrangement 600 for inspecting a material 92 (e.g., feed for or reclaimed material from an AM process) held in a container 90. The arrangement 600 comprises an induction coil sensor arrangement 690 that can be used to monitor/inspect the material 92 in substantially the same manner as previously described. The sensor arrangement 690 comprises a plurality of induction coil sensors 691 configured and positioned to surround or be incorporated into the walls of the container 90. The induction coil sensors 691 are vertically spaced at regular intervals to allow induction and monitoring of currents in the material 91 at spaced apart planes throughout the container 90. The sensor arrangement 690 includes input and output cabling 691, 693 for communication with a central control system.

Figure 21:
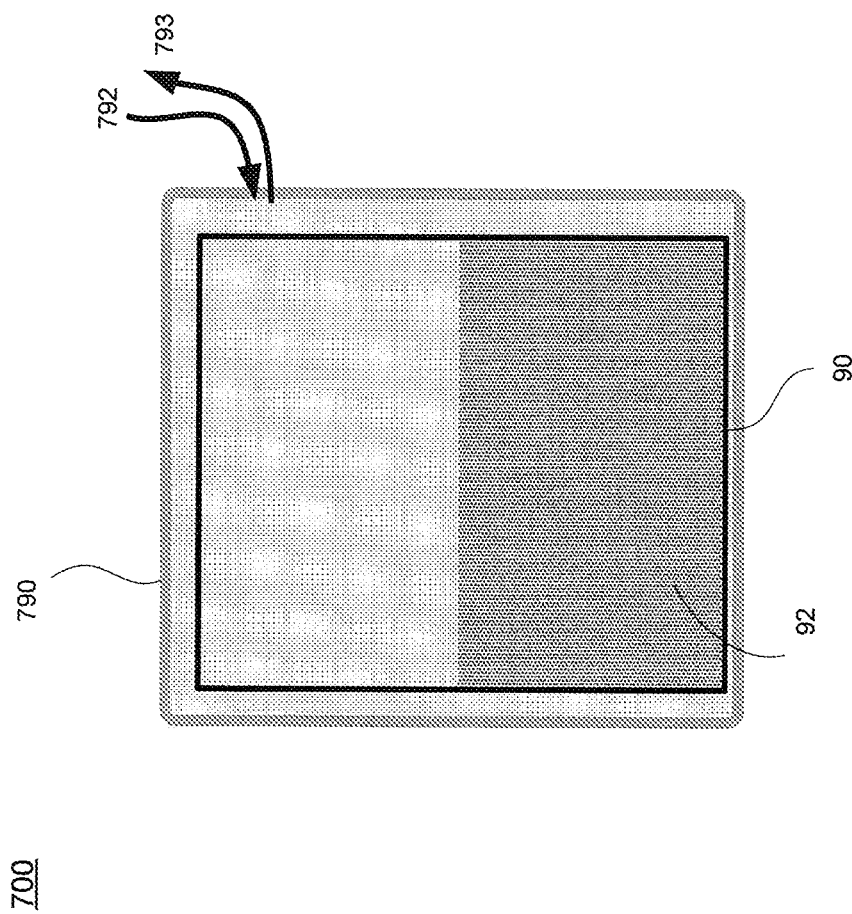
FIG. 21 is a schematic representation of another portable magnetic induction inspection arrangement according to an embodiment of the invention.

FIG. 21 illustrates another stand-alone (and optionally, portable) magnetic induction inspection arrangement 700 for bulk inspection of a material 92 (e.g., feed for or reclaimed material from an AM process) held in a container 90. The arrangement 700 comprises a single induction coil sensor 790 configured and positioned to surround or be incorporated into the walls of the container 90. The induction coil sensor 790 may be configured for bulk induction and monitoring of currents in the material 92 throughout the container 90. The arrangement 700 further includes input and output cabling 792, 793 for communication with a central control system.

It will be understood that the methods of the invention may be used in any material in which magnetic induction techniques may be applied. These would include, but are not limited to, the following:

Magnetically Soft materials
Ferromagnetic materials
All Electrical steels
Soft magnetic composites
Carbon composites with ferrous content
Silicon—Iron
Silicon-Nickel
Silicon—Cobalt
Silicon—Vanadium
Silicon—Zirconium—Iron
Brass (all copper and zinc compositions)
And many others
Electrically semiconductive ceramics
Silicon carbide,
Boron carbide,
Titanium suboxides,
Barium, Strontium
And many others
Magnetically Hard materials
Ferrites
iron-Chromium-Cobalt alloys and powders
iron oxide and barium or strontium carbonate
aluminum, nickel and cobalt
Samarium cobalt (rare earth magnet material) in virgin state
Neodymium Iron Boron (rare earth magnet material) in virgin state
Injection moldable magnets are a composite of resin and magnetic powders of
And many others
Miscellaneous
All grades of stainless steel
All grades of Aluminum
All grades of Copper
All Automotive grade alloys
All Steel alloys
All Marine grade alloys
All Aviation grade alloys
Flexible magnets in virgin state
All metallic carbon fiber materials
And many others
Selected Semiconductor
Silicon (with different doping agents),
Silicon Carbide,
Barium Titanate,
Gallium Nitride,
Gallium Oxide It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

What is claimed is:

1. A method of inspecting an additive manufacturing (AM) build part during its manufacture by an AM apparatus comprising a build chamber and a build platform, the AM build part being produced by fusing an electrically conductive build material in a sequence of layers at a horizontal build plane, the AM apparatus being provided with a nondestructive inspection system comprising a central processing system and a build plane induction coil sensor configured and positioned so that at least a circumferential portion of the build plane induction coil sensor is in the build plane, the method comprising:
prior to construction of a first layer of the AM build part,
initializing the build plane induction coil sensor, and
obtaining first baseline condition data within the build chamber using the build plane induction coil sensor; and
after fusion of one or more build layers of the AM build part at the build plane,
inducing and monitoring currents in the AM build part using the build plane induction coil sensor,
receiving, by the central processing system, first build part current data from the build plane induction coil sensor,
obtaining, by the central processing system, AM build part impedance values using the first baseline condition data, the first build part current data, and complex impedance plane analysis, and
comparing the AM build part impedance values and expected impedance values to identify anomalies.

2. A method according to claim 1 wherein the actions of inducing and monitoring, receiving, obtaining and comparing are repeated after fusion of each of the one or more build layers.

3. A method according to claim 1 further comprising:
changing an operating frequency of the build plane induction coil sensor; and
repeating the actions of inducing and monitoring, receiving, obtaining and comparing.

4. A method according to claim 1 further comprising:
determining expected impedance values for the AM build part.

5. A method according to claim 4 wherein the expected impedance values are determined from a digital simulation of the AM build part.

6. A method according to claim 4 where in the expected impedance values are determined from a database of previously obtained experimental data.

7. A method according to claim 1 wherein the nondestructive inspection system further comprises at least one secondary induction coil sensor configured and positioned so that at least a circumferential portion of each of the at least one secondary induction coil sensor is in a lower chamber plane parallel to and below the build plane, the method further comprising:
prior to construction of the first layer of the AM build part,
initializing the at least one secondary induction coil sensor, and
obtaining second baseline condition data within the build chamber using the at least one secondary induction coil sensor; and
after deposition of one or more build layers of the AM build part at the build plane,
inducing and monitoring currents in the AM build part using the at least one secondary induction coil sensor,
receiving, by the central processing system, second build part current data from the at least one secondary induction coil sensor,
wherein the central processing system uses the second baseline condition data and the second build part current data in addition to the first baseline condition data and the first build part current data to obtain AM build part impedance values.

8. A method of manufacturing an additive manufacturing (AM) build part using an AM apparatus and a nondestructive inspection system, the AM apparatus comprising a build chamber and a build platform and configured for fusing an electrically conductive build material in a sequence of layers at a horizontal build plane and the nondestructive inspection system comprising a central processing system and an induction coil sensor array comprising a first impedance plane induction coil sensor configured and positioned so that at least a circumferential portion of the first impedance plane induction coil sensor is in the build plane, the method comprising:
initializing the induction coil sensor array;
obtaining baseline condition data within the build chamber using the induction coil sensor array;
positioning an upper surface of the build platform at the build plane;
depositing a layer of the build material at the build plane;
fusing a portion of the build material in a desired pattern to form a current layer of the AM build part;
inducing and monitoring currents in the AM build part using the induction coil sensor array;
receiving, by the central processing system, first build part current data from the induction coil sensor array;
obtaining, by the central processing system, AM build part impedance values using the first baseline condition data, the first build part current data, and complex impedance plane analysis;
comparing the AM build part impedance values and expected impedance values to identify anomalies;
evaluating the nature and severity of any identified anomalies;
determining whether a next build part layer should be constructed; and
responsive to a determination that a next build part layer should be constructed,
lowering the build platform to position an upper surface of the current layer at the build plane, and
repeating the actions of depositing, fusing, inducing and monitoring, receiving, obtaining, comparing and determining.

9. A method according to claim 8 wherein the action of determining whether a next build part layer should be constructed includes:
evaluating the identified anomalies to establish whether any of the anomalies meet predetermined criteria for scrapping the AM build part prior to completion; and
responsive to a finding that one or more of the identified anomalies meet the predetermined criteria, establishing a determination that the next build layer should not be constructed and that manufacture of the build part should be terminated.

10. A method according to claim 8 further comprising:
determining adjustments to the depositing and fusing actions for subsequent build part layers based at least in part on the nature of identified anomalies.

11. A method according to claim 8 further comprising:
determining, based at least in part based on the nature of identified anomalies, whether a corrective action should be applied to the current layer of the AM build part; and
responsive to a determination that a correction action should be applied,
applying the corrective action, and
repeating the actions of inducing and monitoring, receiving, obtaining and comparing.

12. A method according to claim 11 wherein the corrective action comprises:
depositing additional build material on the current layer without moving the build platform; and
fusing at least a portion of the additional build material.

13. A method according to claim 8 further comprising:
changing an operating frequency of the at least one impedance plane induction coil; and
repeating the actions of inducing and monitoring, receiving, obtaining and comparing.

14. A method according to claim 8 wherein the induction coil sensor array comprises at least one secondary impedance plane induction coil sensor configured and positioned in a lower chamber plane parallel to and below the build plane.

15. A method of inspecting an additive manufacturing (AM) build part during its manufacture by an AM apparatus comprising a build chamber and a build platform configured for producing the AM build part by fusing an electrically conductive build material in a sequence of layers at a horizontal build plane, the method comprising:
prior to construction of a first layer of the AM build part,
positioning a build plane induction coil sensor so that at least a circumferential portion of the build plane induction coil sensor in the build plane will surround a post-fusion build part layer;
after fusion of one or more build layers of the AM build part at the build plane,
inducing and monitoring currents in the AM build part using the build plane induction coil sensor,
receiving, by a central processing system, first build part current data from the build plane induction coil sensor,
obtaining, by the central processing system, AM build part impedance values using the first build part current data and complex impedance plane analysis, and
comparing the AM build part impedance values and expected impedance values to identify anomalies.

16. A method according to claim 15 wherein the actions of inducing and monitoring, receiving, obtaining and comparing are repeated after fusion of each of the one or more build layers.

17. A method according to claim 15 further comprising:
changing an operating frequency of the build plane induction coil sensor; and
repeating the actions of inducing and monitoring, receiving, obtaining and comparing.

18. A method according to claim 15 further comprising:
prior to construction of the first layer of the AM build part,
positioning a secondary induction coil sensor so that at least a circumferential portion of the secondary induction coil sensor is in a lower chamber plane parallel to and below the build plane and will surround a previously fused build part layer of the AM build part when the previously fused build part layer is positioned at the lower chamber plane; and
after deposition of one or more build layers of the AM build part at the build plane,
inducing and monitoring currents in the AM build part using the secondary induction coil sensor,
receiving, by the central processing system, second build part current data from the secondary induction coil sensor,
wherein the central processing system uses the second build part current data in addition to the first build part current data to obtain AM build part impedance values.

* * * * *